US010396941B2

United States Patent
Khoryaev et al.

(10) Patent No.: US 10,396,941 B2
(45) Date of Patent: *Aug. 27, 2019

(54) RESOLVING CONCURRENT COMMUNICATIONS AT A RELAY USER EQUIPMENT (UE)

(71) Applicant: INTEL CORPORATION, Santa Clara, CA (US)

(72) Inventors: Alexey Khoryaev, Nizhny Novgorod (RU); Sergey Panteleev, Nizhny Novgorod (RU); Mikhail Shilov, Nizhny Novgorod (RU); Pingping Zong, Randolph, NJ (US); Sergey Sosnin, Zavolzhie (RU)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/557,062

(22) PCT Filed: Dec. 16, 2015

(86) PCT No.: PCT/US2015/066148
§ 371 (c)(1),
(2) Date: Sep. 8, 2017

(87) PCT Pub. No.: WO2016/164084
PCT Pub. Date: Oct. 13, 2016

(65) Prior Publication Data
US 2018/0069664 A1 Mar. 8, 2018

Related U.S. Application Data

(60) Provisional application No. 62/145,325, filed on Apr. 9, 2015.

(51) Int. Cl.
*H04L 1/18* (2006.01)
*H04L 1/16* (2006.01)
(Continued)

(52) U.S. Cl.
CPC .......... *H04L 1/1854* (2013.01); *H04L 1/1621* (2013.01); *H04L 1/1812* (2013.01);
(Continued)

(58) Field of Classification Search
CPC ... H04L 1/1854; H04L 1/1812; H04L 1/1621; H04L 25/0202; H04L 2001/0097; H04W 72/1263; H04W 72/0406
See application file for complete search history.

(56) References Cited

U.S. PATENT DOCUMENTS

2014/0056220 A1 2/2014 Poitau et al.
2015/0085719 A1 3/2015 Yin et al.
2016/0295494 A1* 10/2016 Gulati .................. H04W 40/22

FOREIGN PATENT DOCUMENTS

WO WO 2015047167 A1 4/2015

OTHER PUBLICATIONS

3GPP TSG RAN WG1 Meeting #80bis (R1-151442); Discussion on UE-to-NW Relay Implementation Aspects; Source: Intel Corporation; Agenda Item 7.2.3.2.1; Belgrade, Serbia; Apr. 20-24, 2015.
(Continued)

*Primary Examiner* — Thai Nguyen
(74) *Attorney, Agent, or Firm* — Thorpe North & Western

(57) ABSTRACT

Technology for an eNodeB operable to control communications at a relay user equipment (UE) is disclosed. The eNodeB can select the relay UE to relay proximity services (ProSe) traffic between the eNodeB and a remote UE based on one or more relay quality indicators associated with the relay UE. The eNodeB can communicate, to the relay UE, control signaling to configure one or more orthogonal time-
(Continued)

lines to cause the relay UE to resolve ProSe communications between the relay UE and the remote UE that conflict with uplink hybrid automatic repeat request (HARQ) acknowledgement (ACK) or negative acknowledgement (NACK) transmissions from the relay UE to the eNodeB.

23 Claims, 15 Drawing Sheets

(51) Int. Cl.
*H04W 72/12* (2009.01)
*H04L 1/00* (2006.01)
*H04L 25/02* (2006.01)
*H04W 72/04* (2009.01)

(52) U.S. Cl.
CPC ..... *H04W 72/1263* (2013.01); *H04L 25/0202* (2013.01); *H04L 2001/0097* (2013.01); *H04W 72/0406* (2013.01)

(56) References Cited

OTHER PUBLICATIONS

3GPP TSG RAN WG1 Meeting #75 (R1-135482); Multiplexing of Uu and D2D communication; Source: LG Electronics; Agenda Item 6.2.8.1.3; San Francisco, US; Nov. 11-15, 2013.
LG Electronics; "Multiplexing of Uu and D2D Communication;" 3GPP TSG R1-140335; (Feb. 10-14, 2014); 7 pages; RAN WG1 Meeting #76, Prague, Czech Republic; (Agenda 7.2.8.1.3).

\* cited by examiner

RESOLVING CONCURRENT COMMUNICATIONS AT A RELAY USER EQUIPMENT (UE)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL) and sidelink (SL) transmissions. Standards and protocols that use orthogonal frequency-division multiplexing (OFDM) for signal transmission include the third generation partnership project (3GPP) long term evolution (LTE), the Institute of Electrical and Electronics Engineers (IEEE) 1302.16 standard (e.g., 1302.16e, 1302.16m), which is commonly known to industry groups as WiMAX (Worldwide interoperability for Microwave Access), and the IEEE 1302.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
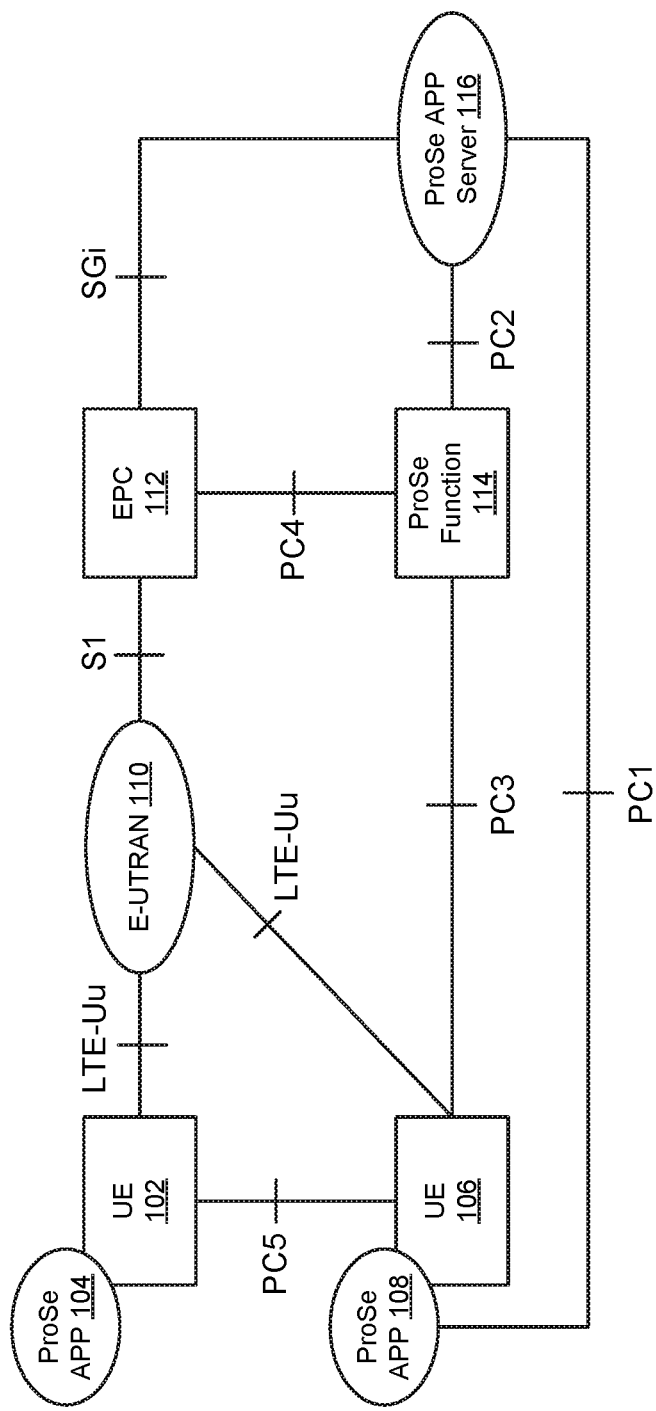
FIG. 1 illustrates a device-to-device (D2D) communication architecture in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Device to device (D2D) communication, which can also be referred to as proximity service (ProSe) communications, for Evolved Universal Terrestrial Radio Access (E-UTRA) or Long Term Evolution (LTE) is being standardized as of 3GPP LTE Release 12. The D2D feature enables the direct communication of data between user equipments (UEs) over the cellular radio spectrum, but without the data being carried by the cellular network infrastructure. This D2D feature can be referred to as a layer 3 (L3)-based UE-to-network (NW) relay function. Within 3GPP, the D2D communication feature can be referred to as ProSe (Proximity Services) Direct Communication. In Release 12 and 13, D2D is primarily targeted for public safety use cases. Therefore, public safety workers can communicate with each other using radio frequency (RF) communications when there is no LTE connection available. In other words, the L3-based UE-to-network relay functionality can extend cell coverage for public safety user cases. In this use case, there is no reliance on network coverage. However, for future releases, commercial applications of D2D are also considered.

In Release 12, there are several D2D features that are covered, such as ProSe device to device discovery in network coverage. ProSe discovery refers to the process by which one UE detects and identifies another UE in proximity using E-UTRAN radio signals. Other D2D features include ProSe device to device broadcast communication, and higher layer (e.g., access stratum (AS) layer) support to enable groupcast (e.g., broadcast or multicast) and unicast over a physical layer broadcast communication.

In one example, the L3-based relaying is seen as upper layer packet forwarding and can be fully transparent to L1 operation. However, the existing LTE Release 12 D2D physical layer can be modified to address potential constraints for L3 relaying operation, considering applicability to voice and video traffic. As discussed below, various L1-related enhancements are provided to enable enhanced L3 UE-to-NW relaying, such as UE-to-NW relay node discovery and selection procedures, bidirectional relaying (e.g., eNodeB to relay UE, or vice versa) and/or unidirectional relaying (e.g., relay UE to eNodeB or eNodeB to relay UE), adaptation of sidelink transmission modes (e.g., Mode-1 and Mode-2), solutions for the concurrent UE-to-NW processes and resource alignment, and minimizing an impact of hybrid automatic repeat request (HARQ) operations.

FIG. 1 illustrates an exemplary device-to-device (D2D) discovery and communication architecture. More specifically, FIG. 1 illustrates a D2D/ProSe non-roaming reference architecture. A first UE 102 can be connected to a E-UTRAN 110 over a first LTE-Uu interface, and a second UE 106 can be connected to the E-UTRAN 110 over a second LTE-Uu interface. The first UE 102 can execute a first ProSe application 104 and the second UE 106 can execute a second ProSe application 108. The first UE 102 and the second UE 106 can be connected via a PC5 interface. In other words, the PC5 interface is the communication link between the two ProSe enabled UEs 102, 106 in direct communication.

In one example, the E-UTRAN 110 can be connected to an Evolved Packet Core (EPC) 112 via an S1 interface. The EPC 112 can be connected to a ProSe function 114 via a PC4 interface, and the EPC 112 can be connected to a ProSe application server 116 over an SGi interface. The ProSe function 114 and the ProSe application server 116 can be connected via a PC2 interface. In addition, one of the UEs can be connected to the ProSe function 114 and the ProSe application server 116. For example, the second UE 106 can be connected to the ProSe function 114 over a PC3 interface, and the second ProSe application 108 that executes on the second UE 106 can be connected to the ProSe application server 116 via a PC1 interface.

Release 13 aims to introduce enhancements to LTE D2D communications and discovery meeting requirements for public safety for: (1) in-network coverage (intra-cell and inter-cell), (2) partial network coverage, and (3) outside network coverage scenarios. For non-public safety discovery, the enhancements to LTE D2D communications can be for in-network coverage (intra-cell and inter-cell).

In addition, Release 13 aims to support the extension of network coverage using layer 3 (L3)-based ProSe UE-to-Network Relays. A ProSe (or D2D) UE-to-Network relay can also be referred to as a relay UE. The relay UE can perform a ProSe UE-to-Network Relay function, which supports the relay of unicast traffic to remote UEs that are not served by the E-UTRAN and the network. In other words, the relay UE can act as a relay between the network and the remote UE that is out-of-coverage. The relay UE will be in-coverage with the network in order to forward the data to the out-of-coverage remote UE. The relay UE can relay unicast traffic in both uplink (UL) and downlink (DL). In other words, the relay UE can forward information from the remote UE in uplink to the network, as well as forward information from the network in downlink to the remote UE. The relay UE can enhance coverage to UEs that are outside the network. The relay UE can provide a generic L3 forwarding function that can relay Internet Protocol (IP) traffic that is relevant for public safety communication. In addition, the relay UE can relay IP traffic (e.g., voice data, video data) to support service continuity for the remote UE.

In one example, the network (e.g., an eNodeB) can control the initiation of the ProSe UE-to-Network Relay feature. The eNodeB can control the initiation of the ProSe UE-to-Network Relay feature per cell or per relay UE or both. The relay UE can be initiated or configured to act as a relay while a connection is established between the relay UE and the network. A given UE (i.e., the remote UE) can (re)select the relay UE, and then a connection can be established between the remote UE and the relay UE. At this point, the relay UE can forward data from the network to the remote UE, or vice versa.

Figure 2:
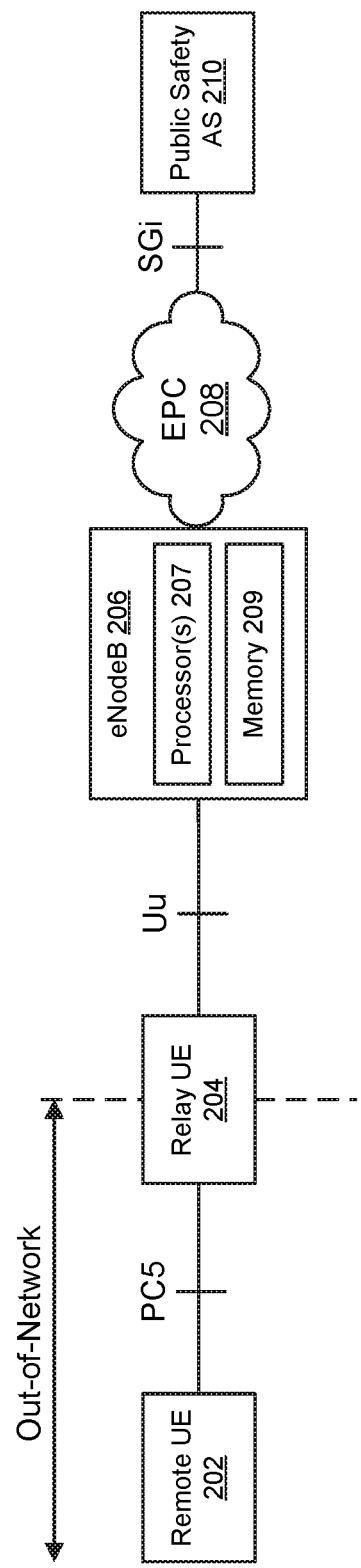
FIG. 2 illustrates a relay user equipment (UE) acting as a relay between a remote UE and an eNodeB in accordance with an example.

FIG. 2 illustrates an example of a relay user equipment (UE) 204 acting as a relay between a remote UE 202 and an eNodeB 206. The eNodeB 206 can include processor(s) 207 and memory 209. The relay UE 204 can also be referred to as a ProSe UE-to-Network Relay. The relay UE 204 can be connected to the eNodeB 206 via a Uu interface. Therefore, the relay UE 204 can be in-coverage with respect to the network. The remote UE 202 can be out-of-coverage. The remote UE 202 may not be directly connected to the eNodeB 206, but rather is directly connected to the relay UE 204 via a PC5 interface. The relay UE 204 can act as an intermediary between the remote UE 202 that is out-of-coverage and the eNodeB 206. The eNodeB 206 can be part of an Evolved Packet Core (EPC) 208, and the eNodeB 206 can be connected to a public safety application server (AS) 210 via an SGi interface.

In one example, there are three types of UE-to-NW relay functions. The first type is unicast relaying, which is one-to-one communication that includes support for the relay of unicast traffic (e.g., UL and DL) between remote UEs that are not served by the E-UTRAN and the network. The ProSe UE-to-NW relay can provide a generic L3 forwarding function that can relay IP traffic that is relevant for public safety communication. The second type is evolved Multimedia Broadcast Multicast Service (eMBMS) relay support, which is one to many communications that includes support for the relay of eMBMS to remote UEs served by the UE-to-NW relay. The third type is an E-UTRAN cell global ID (ECGI) announcement. The announcement of the ECGI by a ProSe UE-to-NW relay can allow remote UEs served by the ProSe UE-to-NW relay to receive the value of the ECGI of the cell serving the ProSe UE-to-NW relay.

In order to facilitate intelligent UE-to-NW discovery and selection, various L1 performance indicators can be added for use in UE-to-NW node discovery and selection procedures. For these procedures, different physical channels can be used. As an example, a physical sidelink discovery channel (PSDCH) can be used. As another example, a physical sidelink control channel (PSCCH) and a physical sidelink shared channel (PSSCH) can be used. Depending on the signaling protocol or configured physical channels, a combination of the PSDCH, PSCCH and PSSCH can be used.

For UE-to-NW relay node discovery (e.g., a discovery procedure performed at the relay UE), certain UEs can announce themselves as UE-to-NW discovery nodes. For this purpose, similar to the LTE Release 12 D2D synchronization and discovery design, a reference signal received power (RSRP) criterion and/or reference signal received quality (RSRQ) can be applied. Given that UE-to-NW relay nodes are to be concentrated relatively close to the cell edge, the RSRP criterion can be used to trigger UE-to-NW announcement signaling from the relay UE. In other words, a particular UE can send announcements indicating that the UE is capable of acting as a relay. In addition, in order to prevent hysteresis (i.e., a ping-pong behavior), L2 filtering can be used and/or two thresholds can be configured to determine an RSRP/RSRQ state when the UE-to-NW announcement is transmitted from the relay UE. In one example, depending on eNodeB radio resource control (RRC) signaling or a pre-configuration, the discovery announcement signaling can be mapped to one or a set of resource pools and associated physical channels (e.g., PSDCH, PSCCH and PSSCH). In addition to the RSRP criterion, the eNodeB can use dedicated UE specific signaling to request a particular UE to serve as an UE-to-NW node (or relay UE). The eNodeB can request to particular UE to regularly transmit announcement signaling or during pre-configured periods of time in indicated physical channels.

For UE-to-NW relay node selection, additional L1 assistance information can be provided to upper layers in order to facilitate an intelligent selection of the UE-to-NW node (or relay UE). In example, the UE-to-NW selection criterion can be left for UE implementation. Alternatively, one or more of the following metrics can be used as L1 performance indicators: RSSI/RSRP/RSRQ metrics, interference level at UE-to-NW nodes and/or channel state information (CSI), such as a channel quality indicator (CQI), precoding matrix indicator (PMI) and rank indicator (RI). In some cases, additional information can be added at upper layers, e.g., system loading or a number of active UE-to-NW connections, battery level, etc. In one example, for UE-to-NW relay node selection, the relay node (or relay UE) can be selected based on a maximum of the following indicators: RSRP, RSRQ, CQI or battery level.

Figure 3A:
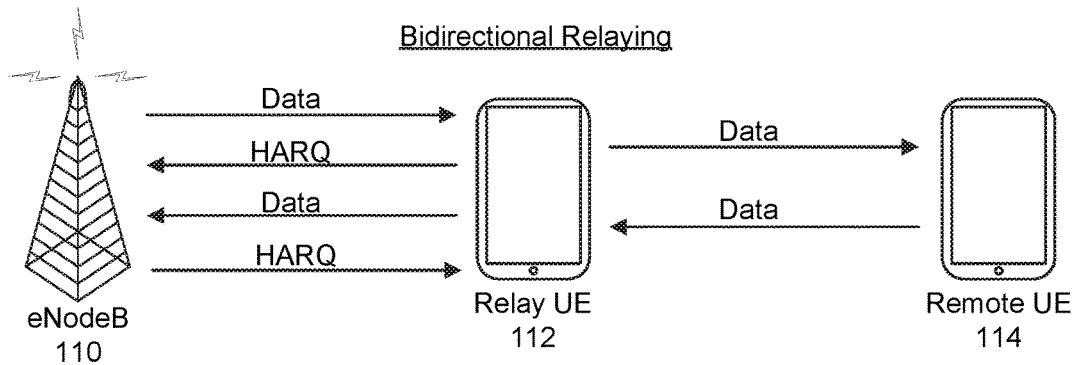
FIGS. 3A-3C illustrate signaling between a relay user equipment (UE), a remote UE and an eNodeB in accordance with an example.
Figure 3B:
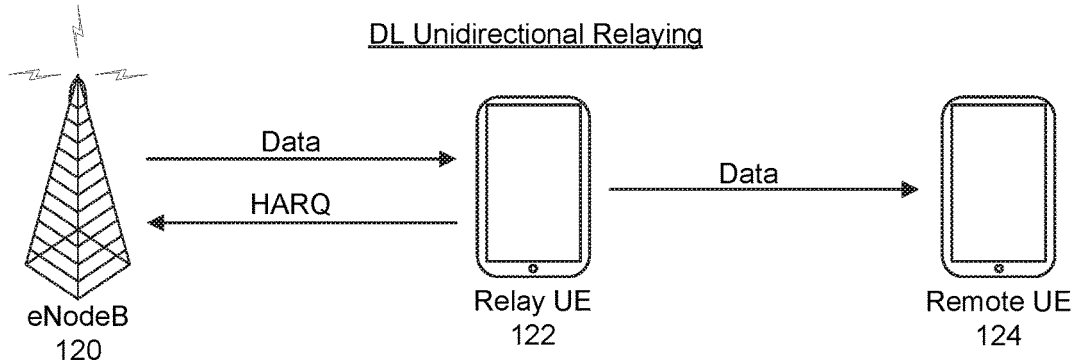
Figure 3C:
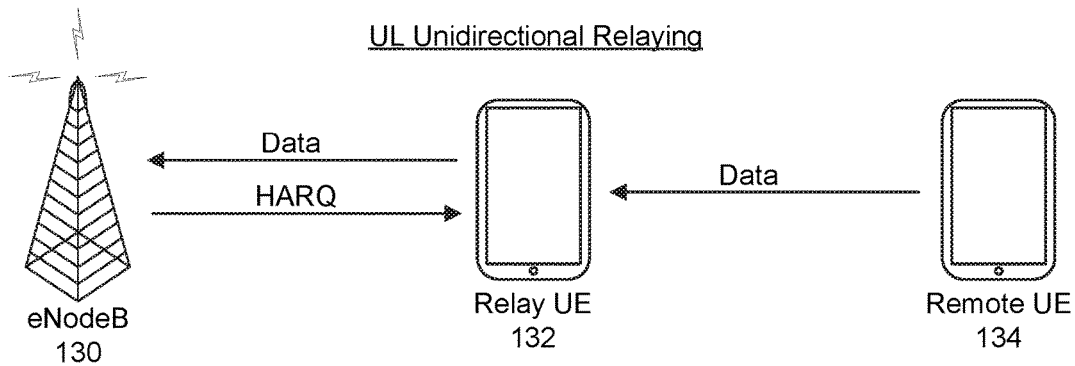

FIGS. 3A-3C illustrate exemplary signaling between a relay user equipment (UE), a remote UE and an eNodeB. The relay UE (or UE-to-NW relay node) can serve as a terminal that relays traffic to or from a remote UE (e.g., an out-of-coverage UE). As shown in FIG. 3A, a relay UE 112 can operate in a bidirectional relaying mode. For example, the relay UE 112 can receive data from an eNodeB 110 and forward the data to a remote UE 114. The relay UE 112 can receive data from the remote UE 114 and forward the data to the eNodeB 110. In addition, the relay UE 112 can transmit hybrid automatic repeat request (HARQ) information to the eNodeB 110. The bidirectional relaying mode can operate as follows: eNodeBU$\leftrightarrows$UE$_R$$\leftrightarrows$UE$_{OOC}$. As shown in FIG. 3B, a relay UE 122 can operate in a downlink unidirectional relaying mode. For example, the relay UE 122 can receive data from an eNodeB 120 and forward the data to a remote UE 124. In addition, the relay UE 122 can transmit hybrid automatic repeat request (HARQ) information to the eNodeB 120. The downlink unidirectional relaying mode can operate as follows: eNodeB$\rightarrow$UE$_R$$\rightarrow$UE$_{OOC}$. As shown in FIG. 3C, a relay UE 132 can operate in an uplink unidirectional relaying mode. For example, the relay UE 132 can receive data from a remote UE 134 and forward the data to an eNodeB 130. UE 114. The uplink unidirectional relaying mode can operate as follows: eNodeB$\leftarrow$UE$_R$$\leftarrow$UE$_{OOC}$.

With respect to the bidirectional relaying mode (as shown in FIG. 3A), for D2D communication in a frequency division duplexing (FDD) spectrum in accordance with LTE Release 12, the UE can use two receive (RX) chains and is able to simultaneously receive data from the eNodeB on a downlink (DL) carrier and receive data from a D2D terminal on an uplink (UL) carrier. Therefore, for the bidirectional relaying mode, there is no conflict in terms of reception of wireless wide area network (WWAN) traffic and reception of D2D traffic. Similarly, there is no conflict in a time division duplexing (TDD) spectrum in terms of reception of WWAN traffic and transmission/reception (Tx/Rx) of D2D traffic, as there are no D2D transmissions on DL subframes. However, in both the FDD and TDD cases, there can be conflicts with respect to transmissions from the relay UE, as the relay UE cannot simultaneously transmit data towards both the eNodeB and the remote UE. In addition, the relay UE may acknowledge DL receptions, and thus, the relay UE cannot utilize certain UL subframes for transmissions towards the eNodeB and/or the remote UE. Therefore, as discussed in further detail below, traffic prioritization mechanisms and/or resource alignments can be utilized to resolve the potential conflicts at the relay UE.

In one example, given that UL transmissions are scheduled by the eNodeB, alignment of eNodeB scheduling decisions and D2D transmissions can be beneficial to avoid transmission collisions at the relay UE (or UE-to-NW node). In another example, a relatively small air-interface latency budget can be beneficial for real time traffic. In yet another example, for UL transmissions, the relay UE can be in an RRC connected state, and thus resource coordination/alignment with the eNodeB can be feasible.

With respect to the unidirectional relay mode towards the remote UE (i.e., downlink UE-to-NW relaying), as shown in FIG. 3B, the reception from the eNodeB is orthogonal (in time for TDD and in frequency for FDD) with the D2D transmission towards the remote UE, except for potential DL HARQ acknowledgement (ACK) or negative acknowledgement (NACK) transmission conflicts. For non-acknowledged traffic (e.g., multicast/broadcast service, such as eMBMS relaying) there is no transmission conflict at the relay UE. However, certain relay UEs (or UE-to-NW nodes) can be selected to forward data towards the remote UEs using certain physical resources/parameters. In one example, in order to reduce the amount of occupied D2D resources, the relay UEs can transmit broadcast traffic in a same frequency network (SFN) manner using the same physical layer parameters. For example, the relay UEs can use the same physical resources, such as the same resource pool, the same SCI resource index ("Resource for PSCCH" field ($n_{PSCCH}$)), the same Time Resource Pattern (T-RPT) index ($I_{TRP}$), the same physical resource blocks, and the same modulation and coding scheme (MCS) index. In this case, the pre-configured mapping between the D2D L1 resources and eNodeB broadcast traffic parameters can be predefined by specification or configured by the eNodeB. In one example, this association can be common across all UEs (e.g., broadcast) or a group of UEs (e.g., multicast). In addition, the RSRP criterion can be applied to select in-coverage UEs (e.g. RRC_IDLE relay UEs) to forward traffic towards to out of coverage UEs (e.g., remote UEs).

In one example, depending on the traffic type (e.g., unicast, multicast or broadcast) the relay UE (or UE-to-NW relay) can be in an RRC connected state or an RRC idle state. As an example, if the traffic type is unicast or multicast, the relay UE can be in the RRC connected state. As another example, if the traffic type is multicast or broadcast, the relay UE can be in the RRC idle state. For unicast relaying, the relay UE can be in the RRC connected state after the relay UE has active traffic. In other words, the relay UE can be in the RRC idle state until the discovered by other UEs (e.g., remote UEs) and a one-to-one connection is established between the relay UE and the remote UE.

With respect to the unidirectional relay mode towards the network (i.e., uplink UE-to-NW relaying), as shown in FIG. 3C, there is a potential conflict at the relay UE between receptions from the remote UE (e.g., an out-of-coverage UE) and transmissions towards the eNodeB from the relay UE. Resource alignment between the relay UE and the remote UE can be utilized to mitigate these potential conflicts. In some cases, the resource alignment can involve the eNodeB, as the eNodeB controls uplink transmissions of the relay UE. In addition, for UL transmissions, the relay UE can be in the RRC connected state, but cannot be in the RRC idle state.

In one example, when access links (i.e., between the relay UE and the remote UE) and backhaul links (i.e., between the eNodeB and the relay UE) are on the same carrier, the following processes can be identified at the relay UE from the physical layer perspective: Process 1 refers to the transmission of D2D data from the relay UE to the remote UE. Process 2 refers to the reception of D2D data at the relay UE from the remote UE. Process 3 refers to the transmission of cellular data from the relay UE to the eNodeB. Process 4 refers to the transmission of HARQ ACK/NACK from the relay UE to the eNodeB.

Based on analysis of bidirectional and unidirectional UE-to-NW relaying types, there are several types of concurrency at the relay UE. In other words, at the relay UE, there are several situations in which communications to the remote UE and/or the eNodeB may possibly overlap or conflict with each other.

In bidirectional relaying, there are two types of concurrent or conflicting processes that can occur at the relay UE (or UE-to-NW node). A first type of conflict can involve cellular link transmissions and direct link transmissions at the relay UE. For example, HARQ ACK/NACK transmissions and D2D data transmissions can conflict at the relay UE. As another example, cellular data transmissions can conflict with D2D data transmissions at the relay UE. A second type of conflict can involve direct link (e.g., D2D) transmissions that conflict with direct link (e.g., D2D) receptions at the relay UE.

In unidirectional DL relaying, there can be one type of concurrent or conflicting process at the relay UE (or UE-to-NW node). The type of conflict can involve cellular link transmissions and direct link transmissions at the relay UE. For example, HARQ ACK/NACK transmissions and D2D data transmissions can conflict at the relay UE.

In unidirectional UL relaying, there can be one type of concurrent or conflicting process at the relay UE (or UE-to-NW node). The type of conflict can involve cellular link transmissions and direct link receptions at the relay UE. For example, uplink data transmissions and D2D data receptions can conflict at the relay UE.

In one example, the relay UE can use uplink subframes to perform D2D communications with the remote UE in time-division duplexing (TDD) or frequency-division duplexing (FDD), which can limit the impact of D2D communications on existing LTE networks. In other words, the relay UE can use uplink subframes to transmit D2D data to the remote UE, and the relay UE can receive D2D data from the remote UE using uplink subframes. In addition, the relay UE can communicate its own cellular data to the eNodeB using uplink subframes. Since the relay UE performs all three types of communications using uplink subframes, it is possible for these communications to conflict with each other in the same uplink subframe. For example, the relay UE may attempt to use the same uplink subframe to send D2D data to the remote UE and send cellular data to the eNodeB. In another example, the relay UE may attempt to use the same uplink subframe to receive D2D data from the remote UE and send cellular data to the eNodeB. In yet another example, the relay UE may attempt to use the same uplink subframe to send D2D data to the remote UE and receive D2D data from the remote UE. In yet another example, the relay UE may attempt to use the same uplink subframe to send HARQ ACK/NACK transmissions to the eNodeB and transmit/receive D2D data to/from the remote UE. On the other hand, the relay UE can receive cellular data from the eNodeB in dedicated downlink subframes, so downlink cellular transmissions do not conflict with the D2D communications or uplink HARQ ACK/NACK or data transmissions at the relay UE. In order to enhance D2D communication for L3 UE-to-NW relaying support, coordination or alignment of resources among the eNodeB and the relay UE, as well as the relay and remote UEs, may be utilized.

In one example, for unicast/multicast UE-to-NW relaying, the relay UE can be in an RRC connected state during traffic forwarding, and for UE-to-NW relaying of multicast/broadcast traffic from the eNodeB, the relay UE can be in an RRC idle state during traffic forwarding.

In one configuration, with respect to sidelink transmission modes (STM), an eNodeB scheduled transmission mode (STM1) and a UE autonomous transmission mode (STM2) can be used for downlink UE-to-NW relaying (e.g., relaying data from the relay UE to the remote UE). There are two possible options depending on network capabilities (e.g., whether the network supports STM1).

In the first option, STM1 is used for relaying data from the relay UE to the remote UE in downlink, and STM2 is used for transmitting data from the remote UE to the relay UE in uplink. In this option, the eNodeB can control D2D transmission resources in one of the transmission directions, and the eNodeB is aware of the transmission status of the relay UE. Therefore, the DL transmissions and HARQ ACK/NACKs can be aligned with the D2D transmission pattern provided by the eNodeB. The remaining UL subframes can be utilized at the relay UE for transmissions to the remote UE and receptions from the remote UE. However, the remote UE may not be informed on the resources used for cellular transmissions in order to avoid concurrent receptions and transmissions at the relay UE.

In the second option, STM2 can be used for relaying data from the relay UE to the remote UE in downlink, as well as for transmitting data from the remote UE to the relay UE. According to the STM2 operation, both the relay UE and the remote UE randomly select resource from the D2D resource pool. In this case, the alignment with HARQ ACK/NACK transmissions can be difficult to achieve, and thus a number of packets can be dropped (e.g., either at reception or transmission sides of the relay UE or the remote UE) due to multiple concurrent processes at the relay UE.

In one configuration, there are four communication timelines that can be utilized at the relay UE to communicate cellular data and/or D2D data to the eNodeB and/or the relay UE: (1) A UE-to-NW cellular transmission timeline is a timeline that indicates UL subframes used for cellular transmission from the relay UE to the eNodeB. The UE-to-NW cellular transmission timeline can be logically divided into an UL HARQ transmission timeline to acknowledge DL reception, and an UL data transmission timeline in which the relay UE communicates with the eNodeB. In some cases, both timelines can cross in the same UL subframe. (2) A UE-to-NW cellular reception timeline is a timeline that indicates DL subframes used for reception at the relay UE from the eNodeB. (3) A UE-to-NW D2D transmission timeline is a timeline that indicates subframes used for D2D transmission from the relay UE to the remote UE. This timeline can include subframes that belong to PSCCH and PSSCH resource pools, or a PSSCH resource pool. (4) A UE-to-NW D2D reception timeline is a timeline that indicates subframes used for D2D receptions at the relay UE from the remote UE. This timeline can be referred to as a $UE_{OOC}$ D2D transmission timeline, and can include subframes that belong to sidelink transmission mode-2 pools (e.g., PSCCH and PSSCH, or PSSCH).

In one example, for concurrent-free UE-to-NW operation, the UE-to-NW cellular transmission timeline can be orthogonal in time at the relay UE. In LTE Release 12, the UE-to-NW cellular transmission timeline is controlled by the eNodeB. An orthogonal timeline can refer to a timeline that does not contain subframes of another timeline, to which it is assumed to be orthogonal. One example is odd and even subframe sets, which are mutually orthogonal. In another example, for concurrent-free UE-to-NW operation, the UE-to-NW D2D transmission timeline can be orthogonal in time at the relay UE. In LTE Release 12, the UE-to-NW D2D transmission timeline is controlled by the eNodeB for STM1 and by the relay UE for STM2. In yet another example, for concurrent-free UE-to-NW operation, the UE-to-NW D2D reception timeline can be orthogonal in time at the relay UE. In general, the UE-to-NW D2D reception timeline can be controlled by the remote UE. In some cases, the UE-to-NW D2D reception timeline can be controlled by the relay UE or the eNodeB.

Figure 4:
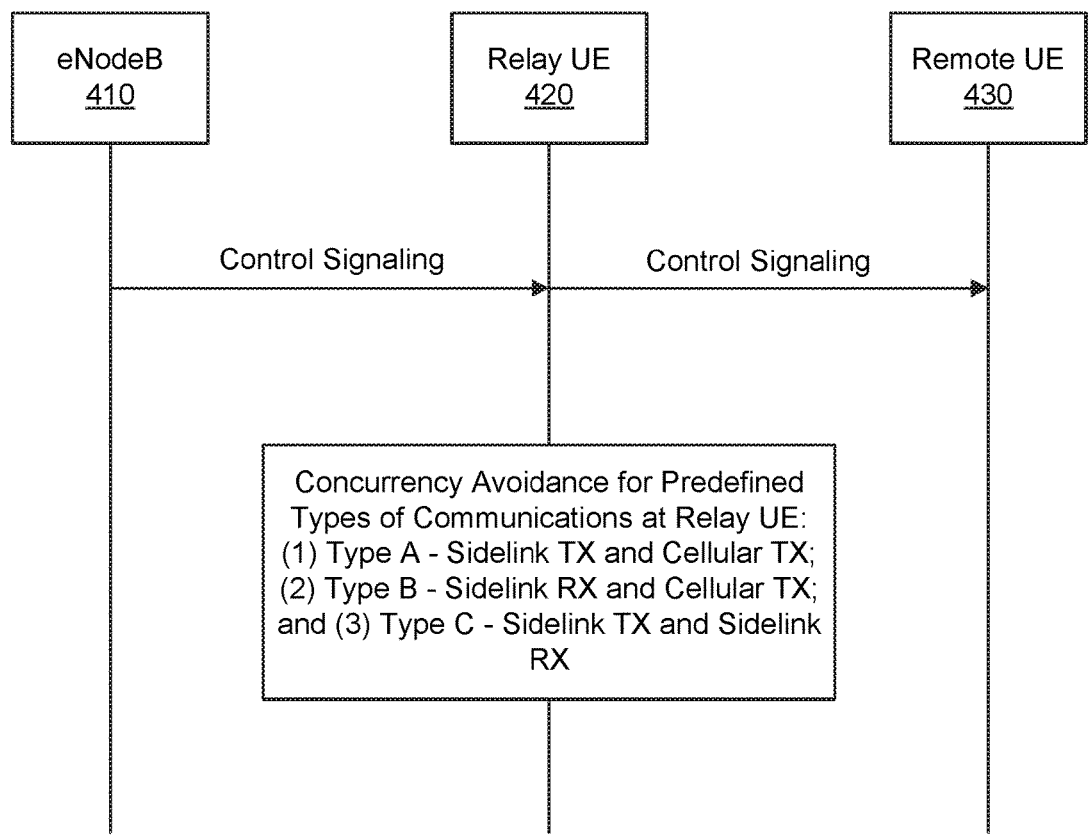
FIG. 4 illustrates control signaling between an eNodeB and a relay user equipment (UE) and a remote UE for resolving predefined types of concurrent communications at the relay UE in accordance with an example.

FIG. 4 illustrates exemplary control signaling between an eNodeB 410 and a relay user equipment (UE) 420 and a remote UE 430 for resolving predefined types of concurrent communications at the relay UE 420. The control signaling communicated from the eNodeB 410 can be physical layer signaling or higher layer signaling. As previously described, the predefined types of concurrent communications at the relay UE 420 can include: (1) a D2D transmission from the relay UE 420 to the remote UE 430 that conflicts with a cellular transmission from the relay UE 420 to the eNodeB 410; or (2) a D2D reception at the relay UE 420 from the remote UE 430 that conflicts with a cellular transmission from the relay UE 420 to the eNodeB 430; or (3) a D2D transmission from the relay UE 420 to the remote UE 430 that conflicts with a D2D reception at the relay UE 420 from the remote UE 430. The predefined types of concurrent communications can correspond to Type A, Type B and Type C, respectively. Therefore, the relay UE 420 and/or the remote UE 430 can receive the control signaling from the eNodeB 410, and the control signaling can provide concurrency avoidance for the predefined types of concurrent communications at the relay UE 420.

The specific mechanisms and/or control signaling involved in resolving the Type A, Type B and Type C concurrencies at the relay UE are described in further detail below.

In one configuration, the Type A UE-to-NW concurrency can refer to a conflict between the UE-to-NW cellular transmission timeline and the UE-to-NW D2D transmission timeline. The Type A concurrency can be resolved in various manners. For example, the time orthogonal (i.e., not conflicting) cellular transmission and D2D transmission at the relay UE can be achieved via a pool configuration mechanism or a time pattern selection mechanism.

Figure 5:
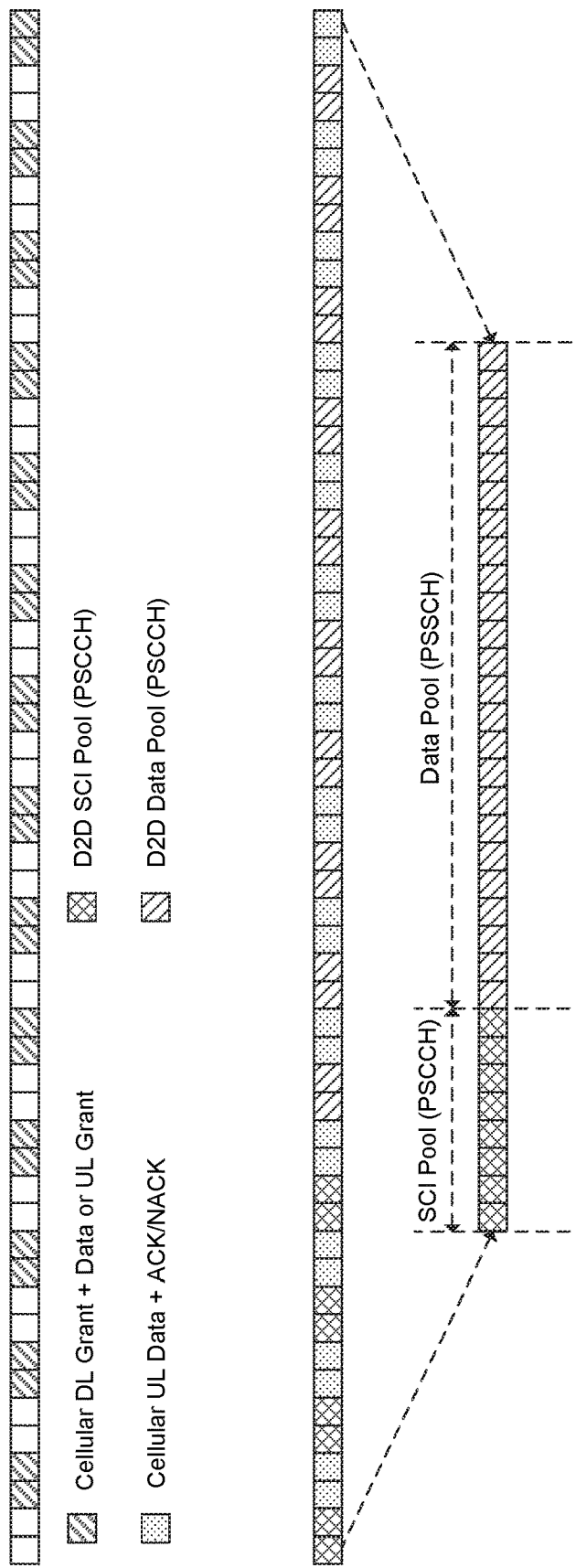
FIG. 5 illustrates a resource pool configuration that includes orthogonal cellular transmission resources and device-to-device (D2D) transmission resources for a relay user equipment (UE) in accordance with an example.

FIG. 5 illustrates an exemplary resource pool configuration that includes orthogonal cellular transmission resources and device-to-device (D2D) transmission resources for a relay user equipment (UE). The resource pool configuration can divide uplink subframes based on cellular subframes and D2D subframes. As shown in FIG. 5, the timeline can indicate: (1) a cellular DL grant and data or an UL grant: (2) cellular UL data and ACK/NACK; (3) a D2D sidelink control information (SCI) pool with respect to the PSCCH; and (4) a D2D data pool with respect to the PSSCH.

In one example, the eNodeB can schedule cellular DL or UL transmissions such that overlap between the UE-to-NW cellular transmission timeline and the UE-to-NW D2D transmission timeline is avoided. In this approach, the maximum data rates for UE-to-NW relaying throughput can be limited in both directions, but can simplify UE-to-NW operation. In addition, this approach can involve eNodeB scheduling restrictions and may not be directly applied in case of STM1, since in this approach, the UL subframes can be used for D2D transmissions subject to an eNodeB dynamic scheduling decision.

In one example, a time pattern selection approach can be utilized for STM1 and STM2. With respect to STM1, the eNodeB can fully control the UE-to-NW cellular transmission timeline and the UE-to-NW D2D reception timeline, and thus, Type A conflicts can be resolved by eNodeB implementation. With respect to STM2, the relay UE can know the UE-to-NW cellular transmission timeline in order to avoid transmission conflicts at the relay UE. The UE-to-NW cellular transmission timeline can be signaled to the relay UE by the eNodeB, such that the relay UE can select an SCI resource index ("Resource for PSCCH channel" field $n_{PSCCH}$), and T-RPT pattern (Time Resource Pattern Index—$I_{TRP}$ indicates subframes of PSSCH pool) for D2D transmissions. In one example, the UE-to-NW cellular transmission timeline can be implicitly derived from the eNodeB DL and UL scheduling decision by processing downlink control information (DCI) messages. In particular, the relay UE can derive the cellular transmission timelines if semi-persistent scheduling is applied by the eNodeB. Alternatively, the eNodeB can signal to the relay UE (or UE-to-NW node) the cellular transmission timeline that the eNodeB is planning to use. The cellular transmission timeline can be provided in the form of parameters used in time periodic equations, or in the form of time resource patterns of transmissions, e.g., $I_{TRP}$ or a repeated subframe bitmap.

In one example, the UE-to-NW cellular transmission timeline can be prioritized over the UE-to-NW D2D transmission timeline. This prioritization can be applied to the D2D transmissions from the relay UE. However, given that the relay UE may not know the eNodeB scheduling decisions in advance, this approach can be insufficient and can complicate the UE-to-NW implementation and performance. In addition, the eNodeB can configure alternative prioritization rules, e.g., the eNodeB can prioritize the UE-to-NW D2D transmission timeline. However, such an approach can lead to unknown UE behavior at the eNodeB side. Therefore, in addition to the prioritization, the relay UE can receive additional signaling from the eNodeB to resolve concurrency issues.

In one configuration, the Type B UE-to-NW concurrency can refer to a conflict between the UE-to-NW cellular transmission timeline and the UE-to-NW D2D reception timeline. The Type B concurrency can be resolved using similar mechanisms as discussed with respect to the Type A concurrency. In other words, the time orthogonal cellular transmission and D2D reception of the relay UE (or UE-to-NW node) can be achieved using similar options as compared to the time orthogonal cellular transmission and D2D transmission. For example, the time orthogonal (i.e., not conflicting) cellular transmission and D2D reception at the relay UE can be achieved via a pool configuration mechanism or a time pattern selection.

In one example, a pool configuration mechanism can be applied to avoid overlap between the UE-to-NW cellular transmission timeline and the UE-to-NW D2D reception timeline. This approach has similar drawbacks as discussed in application to the Type A concurrency.

In one example, a time pattern selection approach can be utilized for STM1 and STM2. With respect to STM1, the eNodeB can control the UE-to-NW cellular transmission timeline, but the eNodeB does not control the UE-to-NW D2D reception timeline. The STM1 can be extended to also control the UE-to-NW D2D reception timeline. The eNodeB can use sidelink control information (SCI) signaling, such as SCI format 0 or another format, e.g., SCI Format X, wherein X is a defined integer. In another example, the eNodeB can use UE-specific MAC/RRC signaling to indicate the UE-to-NW D2D reception timeline to the relay UE. The UE-to-NW D2D reception timeline can be delivered to the relay UE (or UE-to-NW node) in the form of a time resource pattern for transmission (e.g., a combination of the $I_{TRP}$ index and the PSCCH resource index). In one example, the pattern can be associated with the particular resource pool, e.g., the pattern can be implicitly associated based on the transmission timing or explicitly associated based on configuration. In another example, the pattern (or UE-to-NW D2D reception timeline) can be delivered to the remote UE (or $UE_{OOC}$) by the relay UE (or UE-to-NW node) using a type of control signaling, such as SCI at L1 or MAC/RRC at L2. In this case, the remote UE can use the received pattern as its own transmit pattern, or construct a new pattern based on this information.

With respect to STM2, the relay UE can know the UE-to-NW cellular transmission timeline in order to avoid transmission conflicts. The UE-to-NW cellular transmission timeline can be signaled from the eNodeB to the relay UE, such that the relay UE can select a SCI resource index ("Resource for PSCCH" field $n_{PSCCH}$), and T-RPT pattern (Time Resource Pattern Index—$I_{TRP}$) for D2D receptions, and then forward this information to the remote UE.

In one example, the UE-to-NW cellular transmission timeline can be prioritized over the UE-to-NW D2D reception timeline. This prioritization can be applied to the D2D operations at the relay UE. However, given that the eNodeB does not know the UE-to-NW D2D reception timeline, this approach can be insufficient and can complicate the UE-to-NW implementation and performance.

In one configuration, the Type C UE-to-NW concurrency can refer to a conflict between the UE-to-NW D2D transmission timeline and the UE-to-NW D2D reception timeline. The Type C concurrency can be resolved in various manners. For example, the time orthogonal (i.e., not conflicting) D2D transmission and D2D reception at the relay UE can be achieved via a pool configuration mechanism or a time pattern selection mechanism.

Figure 6:
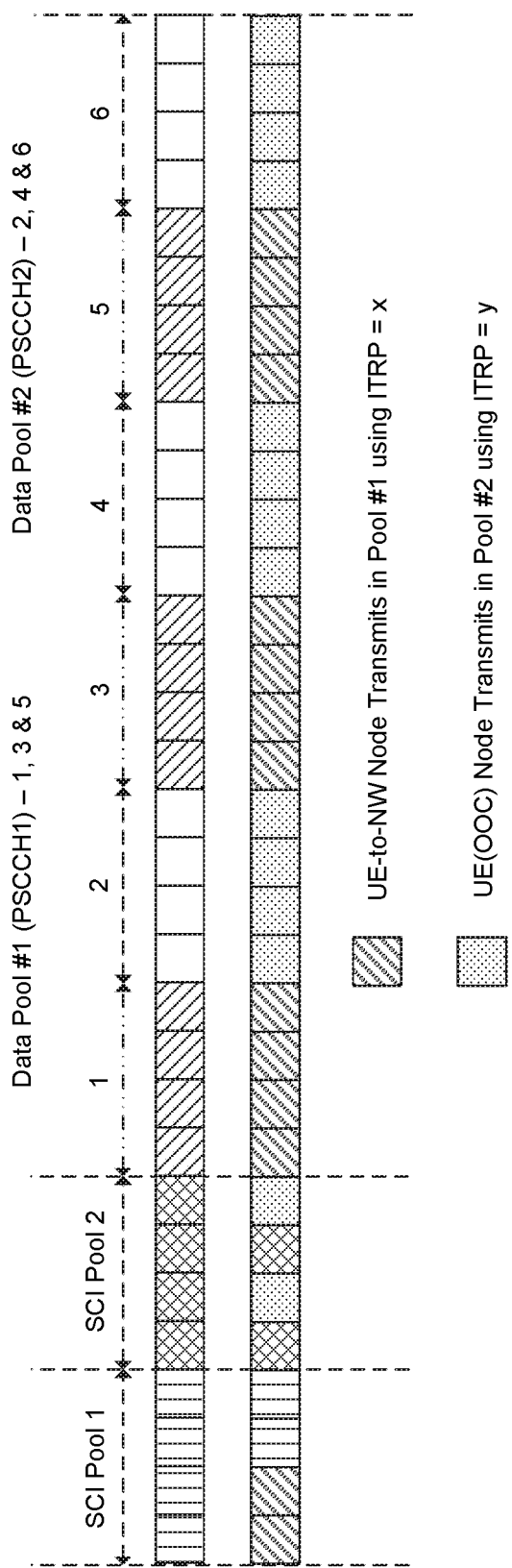
FIG. 6 illustrates a resource pool configuration that includes orthogonal device-to-device (D2D) transmission resources and D2D reception resources for a relay user equipment (UE) in accordance with an example.

FIG. 6 illustrates an exemplary resource pool configuration that includes orthogonal device-to-device (D2D) transmission resources and D2D reception resources for a relay user equipment (UE). The pool configuration mechanism can be applied to avoid overlap between the UE-to-NW D2D transmission timeline and the UE-to-NW D2D reception timeline. In this approach, as shown in FIG. 6, two time orthogonal pools can be configured. In the first data pool, the relay UE (or UE-to-NW node) can perform D2D transmissions to the remote UE (or $UE_{OOC}$), and in the second data pool, the relay UE can perform D2D receptions from the remote UE. The first data pool can be associated with a first physical sidelink shared channel (PSSCH) and the second data pool can be associated with a second PSSCH. As shown in FIG. 6, the relay UE can transmit in the first data pool using $I_{TRP}=x$, and the remote UE can transmit in the second data pool using $I_{TRP}=y$. In addition, the first data pool and the second data pool can follow a first sidelink control information (SCI) pool and a second SCI pool. Moreover, pool selection for UE-to-NW relaying can be coordinated among UEs or implicitly derived from SCI or data transmissions. In another example, the pools can be configured by the eNodeB or preconfigured (e.g., the first data pool can be used for transmissions towards the remote UE and the second data pool can be used for transmissions towards the eNodeB).

In one example, the time pattern selection mechanism can be separate for STM1 and STM2. With respect to STM1, the eNodeB can indicate to the relay UE both the UE-to-NW D2D transmission timeline and the UE-to-NW D2D reception timeline. In this case, the remote UE can transmit D2D traffic using the time resource pattern indicated by the eNodeB as being for UE-to-NW node reception. In one example, the eNodeB can send two sets of control information (e.g., $I_{TRP}$ and $n_{PSCCH}$ and frequency resources)—the first set can be used for UE-to-NW D2D transmissions and the second set can be used for UE-to-NW D2D receptions. The types of signaling (e.g., physical layer signaling or higher layer signaling) the eNodeB can use to deliver the two sets of control information to the relay UE is described below.

In one example, the eNodeB can transmit two sets of control information to a relay UE, wherein a first DCI format 5 transmission is for UE-to-NW D2D transmissions and the second DCI format 5 transmission is for UE-to-NW D2D receptions. Each of the DCI format 5 transmissions can include control information (e.g., $I_{TRP}$ and $n_{PSCCH}$ and frequency resources). In one example, each of the two DCI format 5 transmissions can be distinguished by different D2D radio network temporary identifiers (RNTIs), such as D2D RNTI Tx and D2D RNTI Rx, or by another field within the D2D DCI format. In another example, a new DCI format (e.g., DCI format Y) can accommodate the two patterns corresponding to the UE-to-NW D2D transmissions and the UE-to-NW D2D receptions. In another example, the remote UE can implicitly derive the pattern for UE-to-NW D2D transmissions based on UE-to-NW SCI transmission parameters. In yet another example, the relay UE can perform the D2D transmission in a subset of resources within a time resource pattern, wherein the time resource pattern is signaled by the relay UE. Moreover, in one example, the eNodeB can use MAC or RRC signaling in order to deliver time patterns for UE-to-NW D2D receptions.

In one example, the second set of control information for UE-to-NW D2D receptions (which includes $I_{TRP}$ and $n_{PSCCH}$) can be utilized at the relay UE in two separate manners. First, the relay UE can signal $I_{TRP}$ by sending an SCI message in the PSCCH to the remote UE, and the remote UE can use this pattern for data transmissions in the same resource pool. Second, the relay UE can forward the $I_{TRP}$ and other parameters to the remote UE using SCI or L2 control signaling, and the remote UE can apply this pattern for subsequent transmissions.

Figure 7A:
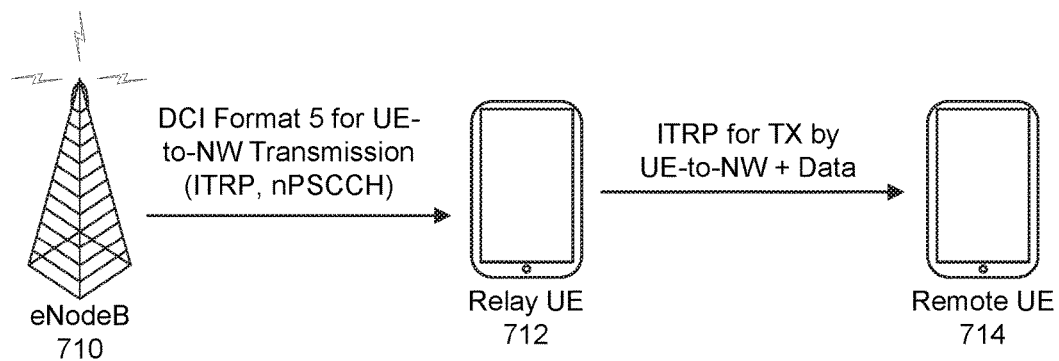
FIGS. 7A and 7B illustrate an eNodeB operable to control device-to-device (D2D) transmission and reception resources of a relay user equipment (UE) via pattern signaling in accordance with an example.
Figure 7B:
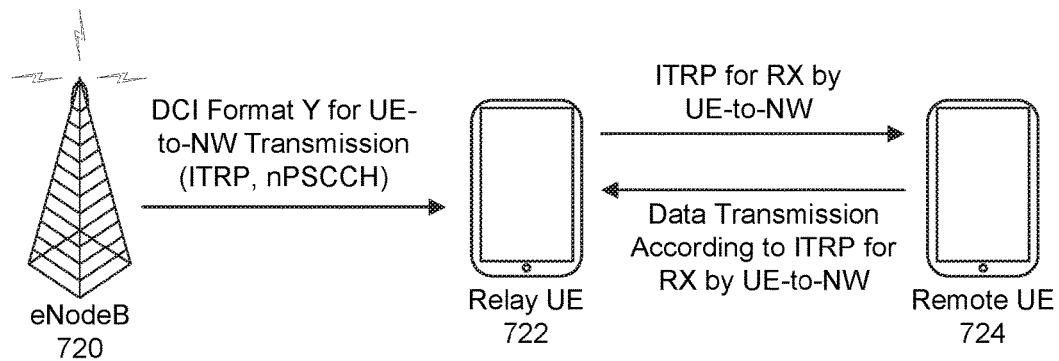

FIGS. 7A and 7B illustrate an exemplary eNodeB operable to control device-to-device (D2D) transmission reception resources of a relay user equipment (UE) via pattern signaling. As shown in FIG. 7A, an eNodeB 710 can transmit a first set of control information to a relay UE 712. More specifically, the eNodeB 710 can use physical layer signaling to send a downlink control information (DCI) format 5 to the relay UE 712 for UE-to-NW D2D transmissions (which includes $I_{TRP}$ and $n_{PSCCH}$), and the relay UE 712 can forward the $I_{TRP}$ to the remote UE 714. As shown in FIG. 7B, an eNodeB 720 can transmit a second set of control information to a relay UE 722. More specifically, the eNodeB 720 can use physical layer signaling to send a downlink control information (DCI) format Y to the relay UE 722 for UE-to-NW D2D receptions (which includes $I_{TRP}$ and $n_{PSCCH}$). The relay UE 722 can forward the $I_{TRP}$ to the remote UE 724, and the remote UE 724 can perform a data transmission with the relay UE 722 according to the $I_{TRP}$ received from the relay UE 722.

With respect to STM2 and the Type C concurrency, the remote UE can know the UE-to-NW cellular transmission timeline in order to avoid transmission conflicts. Alternatively, the UE-to-NW cellular transmission timeline knowledge can be left at the relay UE (or UE-to-NW node). Using the UE-to-NW cellular transmission timeline, the relay UE can decide on resources for transmission towards the remote UE and resources for receptions from the remote UE.

Figure 8A:
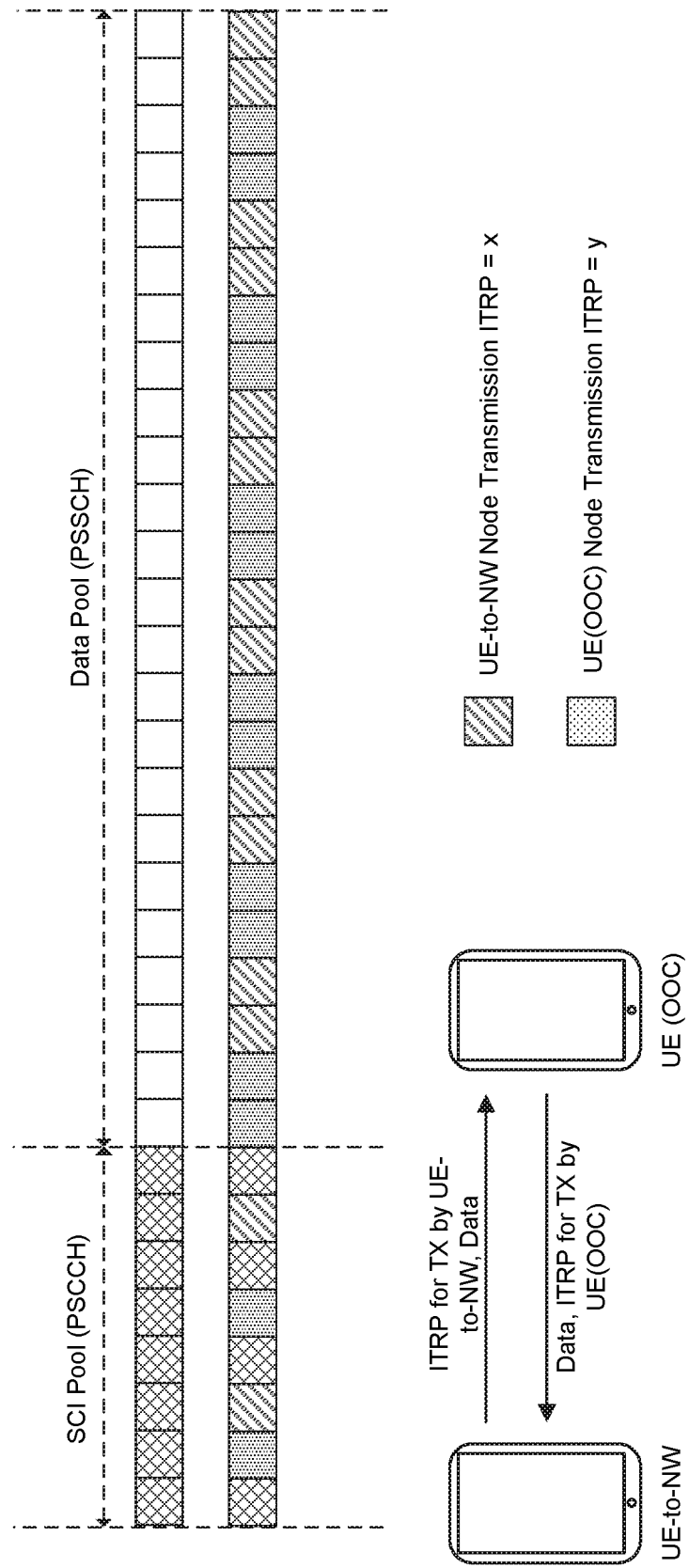
FIGS. 8A and 8B illustrate pattern signaling from a relay user equipment (UE) to configure orthogonal device-to-device (D2D) transmission resources and D2D reception resources in accordance with an example.
Figure 8B:
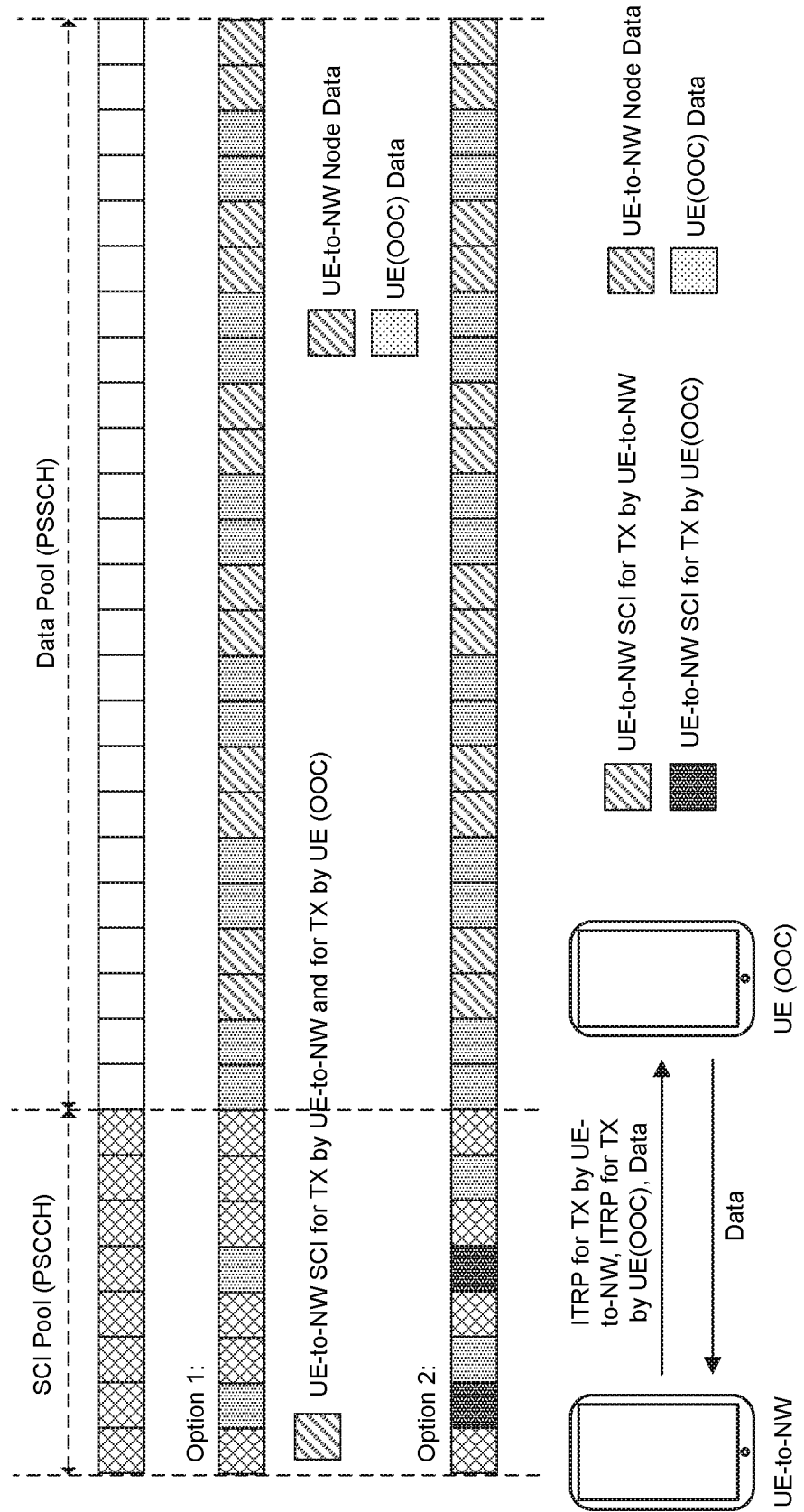

FIGS. 8A and 8B illustrate exemplary pattern signaling from a relay user equipment (UE) to configure orthogonal device-to-device (D2D) transmission resources and D2D reception resources. As shown in FIG. 8A, resources for remote UE transmissions can be acquired autonomously based on sidelink control information (SCI) decoding. The relay UE can transmit the $I_{TRP}$ for D2D transmissions from the relay UE, as well as data, and the remote UE can respond with data and the $I_{TRP}$ for D2D transmissions from the remote UE. In other words, the remote UE can respond with both sidelink control information (SCI) and data. As shown in FIG. 8B, resources for remote UE transmissions can be provided by the relay UE through control signaling. The relay UE can signal the index for D2D reception from the remote UE, such that the relay UE can utilize those for subsequent D2D data transmissions from the remote UE. The relay UE can transmit the $I_{TRP}$ for D2D transmissions from the relay UE, the $I_{TRP}$ for D2D transmissions from the remote UE, and data. The remote UE can transmit data according to the SCI from the relay UE.

In one configuration, the LTE Release 12 HARQ ACK/NACK timelines can restrict a maximum data rate that can be potentially achieved at the relay UE in both transmission directions. This restriction can be noticeable in the downlink transmission direction towards the remote UE. The reason is that unicast DL receptions at the relay UE may be acknowledged by an UL HARQ ACK/NACK transmission from the relay UE to the eNodeB. The uplink subframe utilized by the relay UE to send the acknowledgement to the eNodeB may not be used for D2D communications with the remote UE. Therefore, the maximum DL UE-to-NW relaying throughput can be reduced due to the necessity of the UL HARQ ACK/NACK transmissions. In addition, at the relay UE, the transmission of HARQ ACK/NACKs from the relay UE to the eNodeB using uplink resources can conflict with D2D communications at the relay UE with the remote UE using uplink resources.

Several solutions can be implemented to reduce or avoid conflicts at the relay UE caused by the HARQ operations. At least one of the HARQ options described below can be applied to relay UEs. In one example, UE specific signaling or common radio resource control (RRC) signaling can be provided to the relay UE in order to configure the relay UE to implement at least one of the following HARQ resolution options.

In a first option, the relay UE can utilize a HARQ-less operation. In other words, the relay UE may not transmit HARQ ACK/NACKs to the eNodeB. The HARQ-less operation can remove constraints on the DL UE-to-NW relay throughput and solve potential concurrency issues. However, the removal of the HARQ ACK/NACKs can introduce uncertainty on whether the relay UE received data from the eNodeB without error at the physical layer, and therefore, the quality of the link between the relay UE and the eNodeB can be degraded.

In a second option to reduce conflicts caused by HARQ transmissions, HARQ bundling and/or multiplexing techniques can be utilized at the relay UE. In order to acknowledge a DL subframe, the HARQ ACK/NACKs can be bundled or multiplexed with an uplink transmission. As an example, 9 DL subframes can be acknowledged with a single UL subframe. By reducing the number of UL subframes on which the HARQ ACK/NACKs are transmitted, the likelihood of conflicts is reduced.

In a third option to reduce conflicts caused by HARQ transmissions, an UL/DL reference configuration can be utilized to shift an UL HARQ timeline, which can reduce the number of UL subframes used for HARQ ACK/NACK transmissions. The UL/DL reference configuration can be used for exchanging ACK/NACKs, but not for exchanging data. The UL/DL reference configuration can include a first subset and a second subset—the first subset can include subframes that are not used to transmit ACK/NACK and the second subset can include subframes that are used to transmit ACK/NACK. In addition, this approach can utilize HARQ bundling and/or multiplexing techniques, such that a reduced number of UL subframes are utilized for HARQ ACK/NACK transmissions. However, this approach may not be optimal for resource pools with a relatively small number of D2D subframes, and therefore, HARQ performance can be degraded.

In a fourth option to reduce conflicts caused by HARQ transmissions, D2D resource pools can be configured to align with cellular and D2D transmissions. In this option, resources for sidelink transmissions can be configured, such that the overlapping of UL ACK/NACK transmissions can be avoided. However, this approach does not achieve high spectrum efficiency and is associated with relatively high overhead, thereby negatively affecting overall UE-to-NW relaying performance. In addition, this approach cannot be directly applied for STM1 and can impose eNodeB scheduling restrictions.

In a fifth option to reduce conflicts caused by HARQ transmissions, time resource patterns can be utilized to control D2D transmissions and receptions at the relay UE. The D2D transmission and reception pattern can be aligned with HARQ timelines used by the eNodeB for communication with the relay UE. This option can involve using dynamic scheduling, as opposed to resource pools, to cause HARQ ACK/NACK transmissions to not overlap with sidelink (or D2D) resources.

In a sixth option to reduce conflicts caused by HARQ transmissions, UE implementation can be utilized to resolve the conflicts. For example, the relay UE can follow prioritization rules defined in LTE Release 12. The relay UE can be aware of an upcoming UL transmission after a DL subframe is processed. The UE can prioritize a cellular transmission by dropping a UE-to-NW D2D transmission (Tx) or reception (Rx), which can result in degraded L3 UE-to-NW performance.

In one configuration, an eNodeB can control UE-to-Network (UE-to-NW) relay operations. The eNodeB can set relay quality indicators for UE-to-NW assignment. The UE can select one or more relay nodes using the quality indicators. The eNodeB can align resources for downlink (DL), uplink (UL) and/or device-to-device (D2D) transmissions and receptions. For example, the eNodeB can configure orthogonal timelines for D2D transmissions and UL transmissions. The eNodeB can configure orthogonal timelines for D2D receptions and UL transmissions. The eNodeB can configure orthogonal timelines for D2D receptions and D2D transmissions. The eNodeB can transmit DL traffic towards a selected relay node based on the configured DL timelines. In addition, the eNodeB can receive UL traffic from the relay node based on the configured UL timelines.

In one configuration, the quality indicators can include an interference level, RSRP, RSRQ, RSSI and/or CSI.

In one configuration, the relay node can be assigned when the quality indicators exceed a defined threshold.

In one configuration, the relay node can be selected based on a maximum value of one or more of the quality indicators.

In one configuration, the eNodeB can configure aligned resources for relaying by multiple relay nodes. For example, the eNodeB can assign the same physical resources, such as the same resource pool, the same SCI resource index ("Resource for PSCCH" field ($n_{PSCCH}$)), the same Time Resource Pattern (T-RPT) index ($I_{TRP}$), the same physical resource blocks, and the same modulation and coding scheme (MCS) index.

In one configuration, the eNodeB can configure: (1) orthogonal timelines for cellular UL transmissions and D2D transmissions; (2) orthogonal timelines for cellular UL transmissions and D2D receptions; and (3) orthogonal timelines for D2D transmissions and D2D receptions, wherein the orthogonal timelines can be configured by orthogonal in time resource pools or time resource patterns of transmission.

In one configuration, a user equipment (UE) can be configured to relay data. The UE can measure one or more relay quality indicators. The UE can determine to become a relay based on the quality indicators. The UE can configure UE-to-NW relay functions. The UE can receive resource configurations for DL, UL and D2D transmissions and receptions. The UE can configure orthogonal timelines for D2D transmissions and UL transmissions. The UE can configure orthogonal timelines for D2D receptions and UL transmissions. The UE can configure orthogonal timelines for D2D receptions and D2D transmissions. The UE can relay traffic towards the eNodeB or towards a remote UE based on the configured D2D, DL and/or UL timelines.

In one configuration, the UE is in an RRC_CONNECTED state when forwarding traffic in a unicast or multicast manner.

In one configuration, the UE is in either an RRC_IDLE state or an RRC_CONNECTED state when the eNodeB is multicasting or broadcasting traffic to the UE.

In one configuration, a user equipment (UE) can be configured to transmit and receive data through a UE-to-NW relay. The UE can discover one or more relay nodes. The UE can measure relay quality indicators of the relay nodes. The UE can select one of the relay nodes based on the quality indicators. The UE can receive resource configurations for D2D transmissions and receptions. The UE can configure orthogonal timelines for D2D receptions and D2D transmissions. The UE can transmit traffic to the relay node based on the configured D2D transmission timeline. In addition, the UE can receive traffic from the relay node based on the configured D2D reception time.

Figure 9:
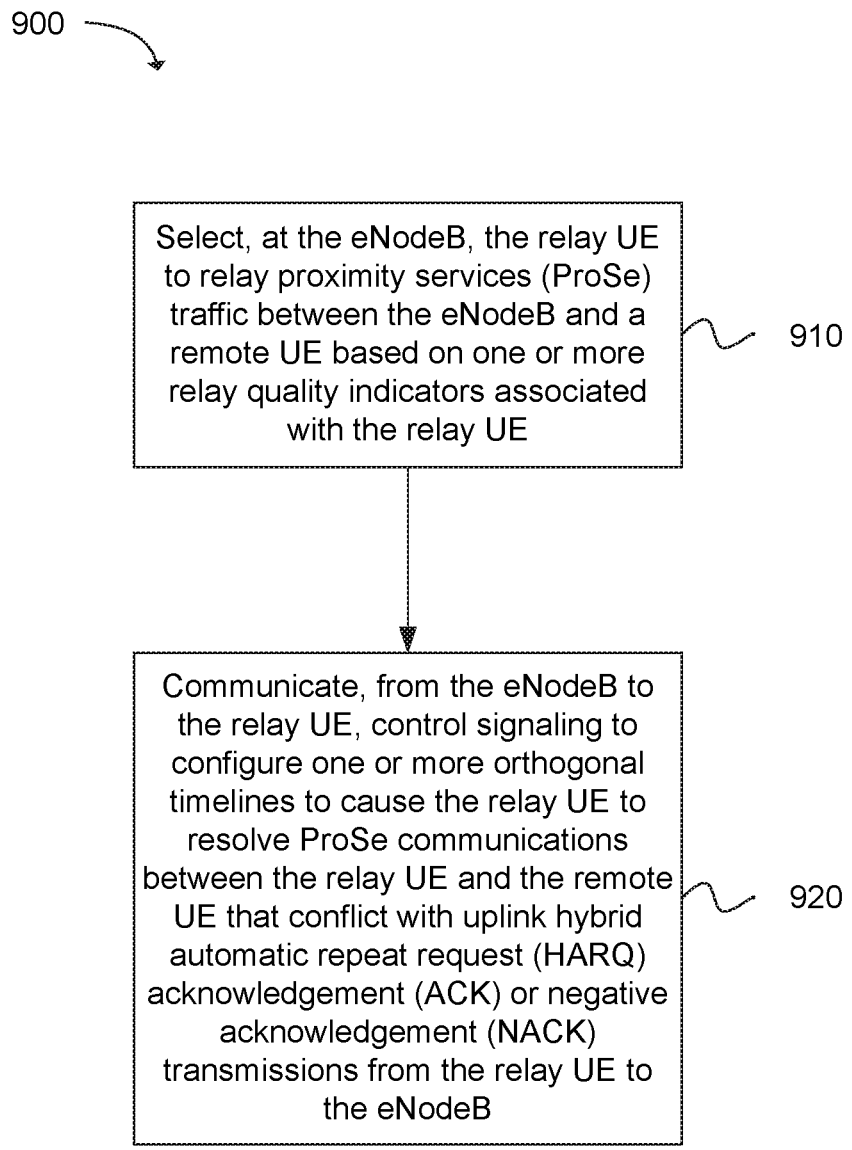
FIG. 9 depicts functionality of an eNodeB operable to control communications at a relay user equipment (UE) in accordance with an example.

Another example provides functionality 900 of an eNodeB operable to control communications at a relay user equipment (UE), as shown in the flow chart in FIG. 9. The eNodeB can comprise one or more processors and memory configured to: select, at the eNodeB, the relay UE to relay proximity services (ProSe) traffic between the eNodeB and a remote UE based on one or more relay quality indicators associated with the relay UE, as in block 910. The eNodeB can comprise one or more processors and memory configured to: communicate, from the eNodeB to the relay UE, control signaling to configure one or more orthogonal timelines to cause the relay UE to resolve ProSe communications between the relay UE and the remote UE that conflict with uplink hybrid automatic repeat request (HARQ) acknowledgement (ACK) or negative acknowledgement (NACK) transmissions from the relay UE to the eNodeB, as in block 920.

Figure 10:
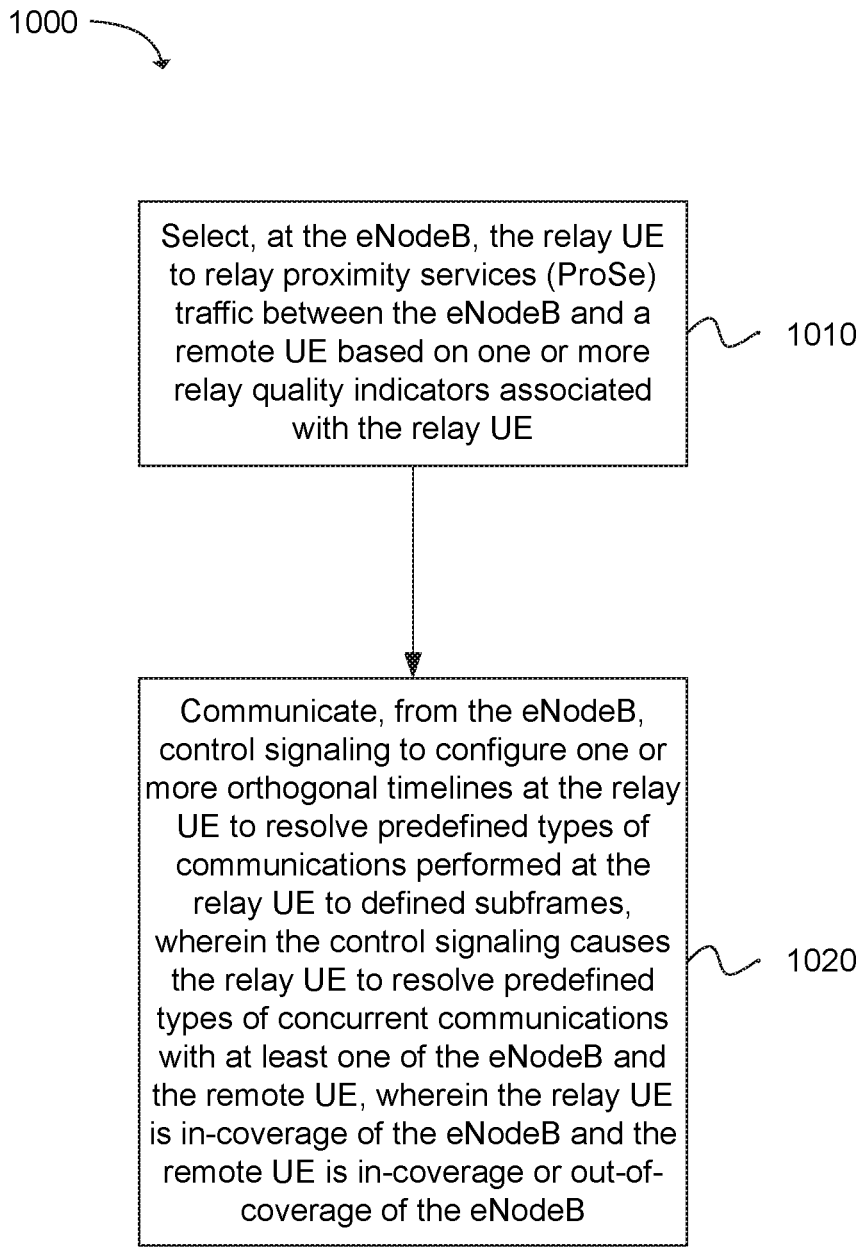
FIG. 10 depicts functionality of an eNodeB operable to control communications at a relay user equipment (UE) in accordance with an example.

Another example provides functionality 1000 of an eNodeB operable to control communications at a relay user equipment (UE), as shown in the flow chart in FIG. 10. The eNodeB can comprise one or more processors and memory configured to: select, at the eNodeB, the relay UE to relay proximity services (ProSe) traffic between the eNodeB and a remote UE based on one or more relay quality indicators associated with the relay UE, as in block 1010. The eNodeB can comprise one or more processors and memory configured to: communicate, from the eNodeB, control signaling to configure one or more orthogonal timelines at the relay UE to resolve predefined types of communications performed at the relay UE to defined subframes, wherein the control signaling causes the relay UE to resolve predefined types of concurrent communications with at least one of the eNodeB and the remote UE, wherein the relay UE is in-coverage of the eNodeB and the remote UE is in-coverage or out-of-coverage of the eNodeB, as in block 1020.

Figure 11:
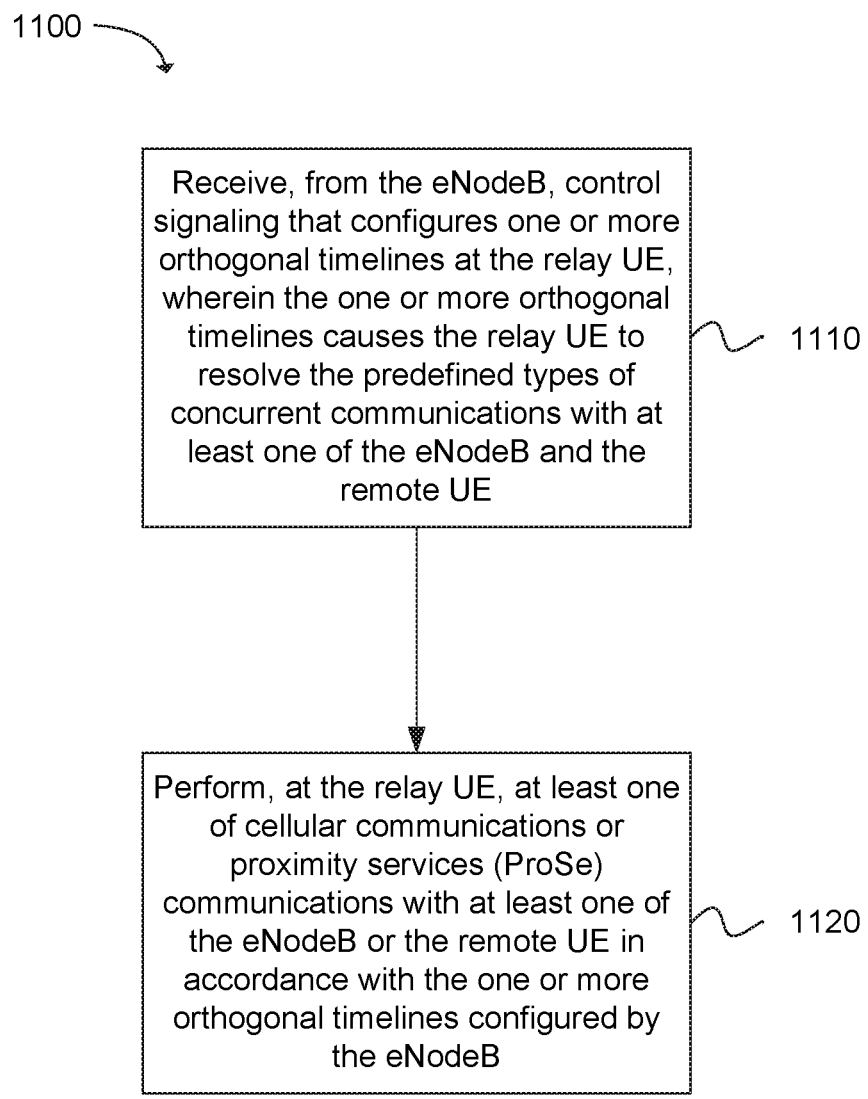
FIG. 11 depicts functionality of a relay user equipment (UE) operable to resolve predefined types of concurrent communications with at least one of an eNodeB and a remote UE in accordance with an example.

Another example provides functionality 1100 of a relay user equipment (UE) operable to resolve predefined types of concurrent communications with at least one of an eNodeB and a remote UE, as shown in the flow chart in FIG. 11. The relay UE can comprise one or more processors and memory configured to: receive, from the eNodeB, control signaling that configures one or more orthogonal timelines at the relay UE, wherein the one or more orthogonal timelines causes the relay UE to resolve the predefined types of concurrent communications with at least one of the eNodeB and the remote UE, as in block 1110. The relay UE can comprise one or more processors and memory configured to: perform, at the relay UE, at least one of cellular communications or proximity services (ProSe) communications with at least one of the eNodeB or the remote UE in accordance with the one or more orthogonal timelines configured by the eNodeB, as in block 1120.

Figure 12:
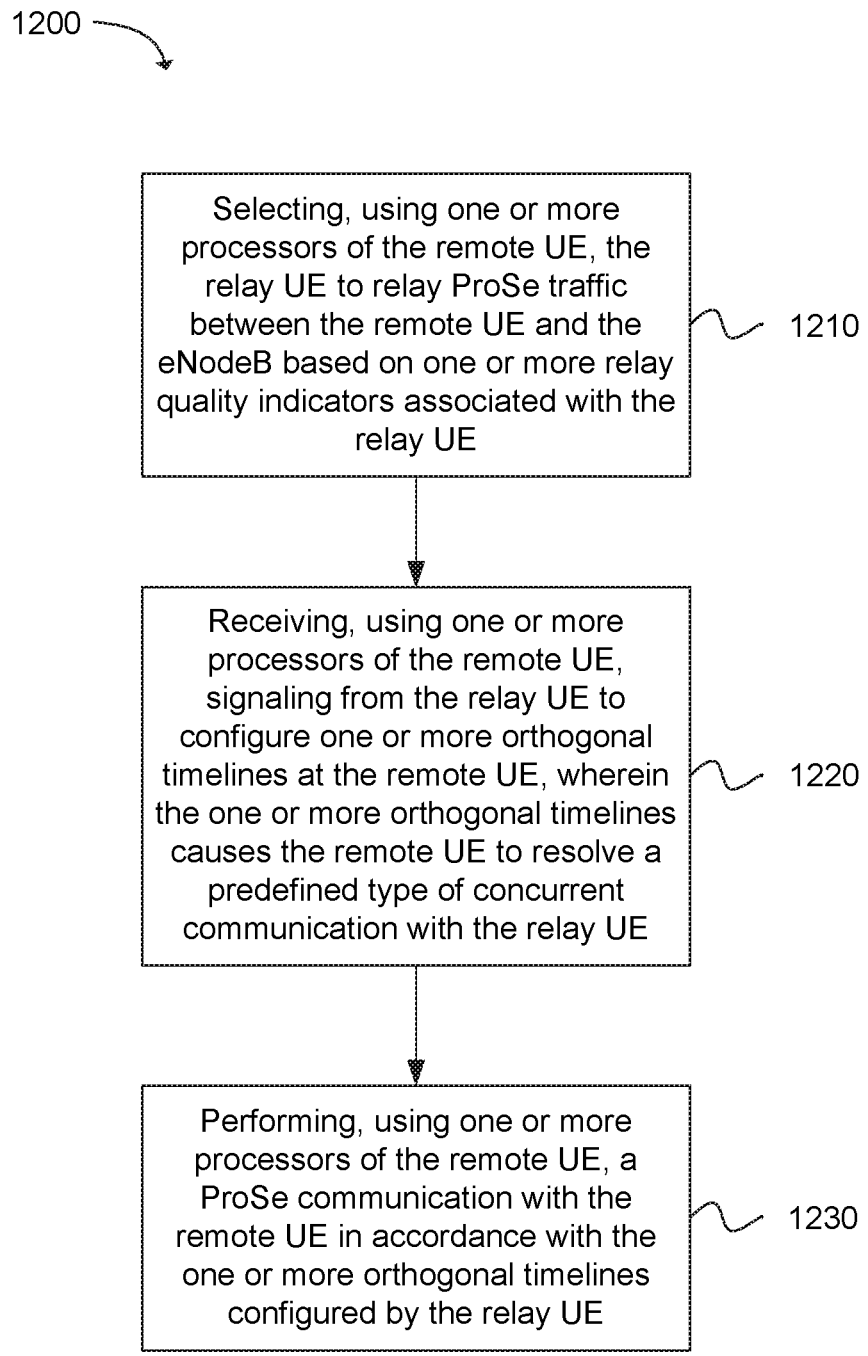
FIG. 12 depicts a flowchart of a machine readable storage medium having instructions embodied thereon for communicating proximity services (ProSe) traffic from a remote user equipment (UE) to an eNodeB via a relay UE in accordance with an example.

Another example provides at least one machine readable storage medium having instructions 1200 embodied thereon for communicating proximity services (ProSe) traffic from a remote user equipment (UE) to an eNodeB via a relay UE, as shown in the flow chart in FIG. 12. The instructions can be executed on a machine, where the instructions are included on at least one computer readable medium or one non-transitory machine readable storage medium. The instructions when executed perform: selecting, using one or more processors of the remote UE, the relay UE to relay ProSe traffic between the remote UE and the eNodeB based on one or more relay quality indicators associated with the relay UE, as in block 1210. The instructions when executed perform: receiving, using one or more processors of the remote UE, signaling from the relay UE to configure one or more orthogonal timelines at the remote UE, wherein the one or more orthogonal timelines causes the remote UE to resolve a predefined type of concurrent communication with the relay UE, as in block 1220. The instructions when executed perform: performing, using one or more processors of the remote UE, a ProSe communication with the remote UE in accordance with the one or more orthogonal timelines configured by the relay UE, as in block 1230.

Figure 13:
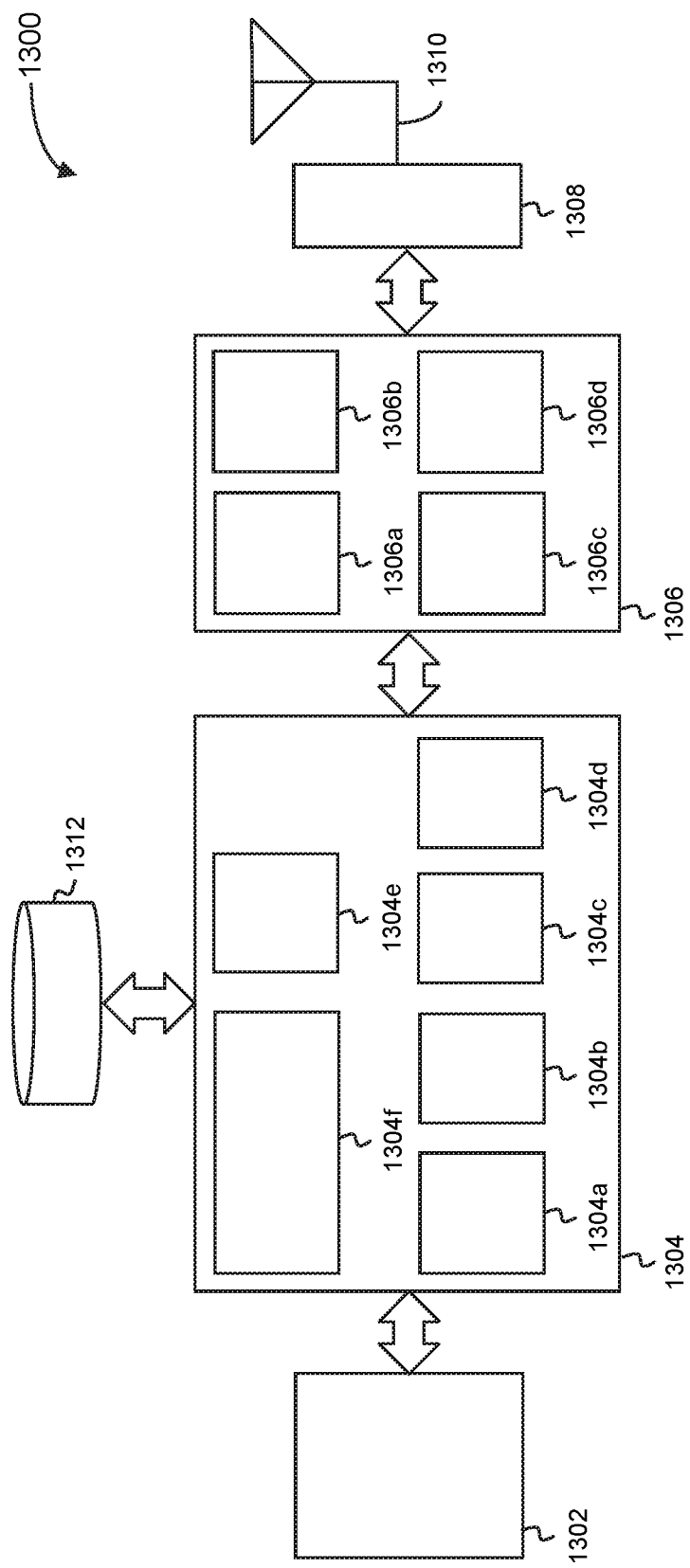
FIG. 13 illustrates a diagram of a wireless device (e.g., UE) in accordance with an example.

FIG. 13 provides an example illustration of a user equipment (UE) device 1300, such as a wireless device, a mobile station (MS), a mobile wireless device, a mobile communication device, a tablet, a handset, or other type of wireless device. The UE device 1300 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1300 can be configured to communicate using at least one wireless communication standard including 3GPP LTE, WiMAX, High Speed Packet Access (HSPA), Bluetooth, and WiFi. The UE device 1300 can communicate using separate antennas for each wireless communication standard or shared antennas for multiple wireless communication standards. The UE device 1300 can communicate in a wireless local area network (WLAN), a wireless personal area network (WPAN), and/or a WWAN.

In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 1312, and may be configured to execute instructions stored in the storage medium 1312 to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

The RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature down-conversion and/or up-conversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct down-conversion and/or direct up-conversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

Figure 14:
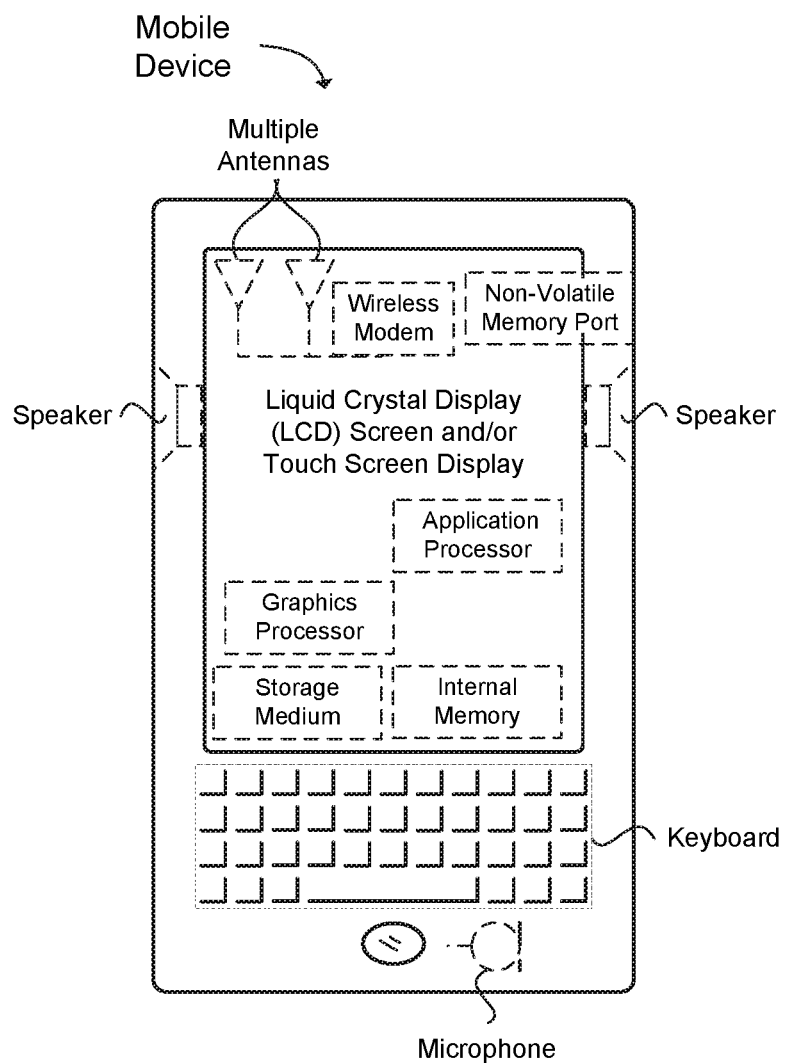
FIG. 14 illustrates a diagram of a wireless device (e.g., UE) in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of an eNodeB operable to control communications at a relay user equipment (UE), the apparatus comprising one or more processors and memory configured to: select, at the eNodeB, the relay UE to relay proximity services (ProSe) traffic between the eNodeB and a remote UE based on one or more relay quality indicators associated with the relay UE; and communicate, from the eNodeB to the relay UE, control signaling to configure one or more orthogonal timelines to cause the relay UE to resolve ProSe communications between the relay UE and the remote UE that conflict with uplink hybrid automatic repeat request (HARQ) acknowledgement (ACK) or negative acknowledgement (NACK) transmissions from the relay UE to the eNodeB.

Example 2 includes the apparatus of Example 1, wherein the HARQ ACK/NACK transmissions from the relay UE to the eNodeB are in response to downlink cellular transmissions from the eNodeB to the relay UE.

Example 3 includes the apparatus of any of Examples 1-2, wherein a predefined type of concurrent communication at the relay UE includes a ProSe reception at the relay UE from the remote UE that conflicts with a cellular transmission from the relay UE to the eNodeB.

Example 4 includes the apparatus of any of Examples 1-3, wherein the control signaling communicated from the eNodeB to the relay UE configures a bundling or multiplexing of HARQ ACK/NACKs at the relay UE in order to resolve conflicts between ProSe communications at the relay UE with the remote UE and HARQ ACK/NACK transmissions from the relay UE to the eNodeB.

Example 5 includes the apparatus of any of Examples 1-4, wherein the control signaling communicated from the eNodeB to the relay UE configures an alignment between ProSe transmission and reception patterns utilized by the relay UE and HARQ ACK/NACK transmission patterns utilized by the relay UE in order to resolve conflicts between ProSe communications at the relay UE with the remote UE and HARQ ACK/NACK transmissions from the relay UE to the eNodeB.

Example 6 includes the apparatus of any of Examples 1-5, wherein the control signaling communicated from the eNodeB to the relay UE configures a reduction in a number of uplink subframes used for HARQ ACK/NACK transmissions at the relay UE in order to resolve conflicts between ProSe communications at the relay UE with the remote UE and HARQ ACK/NACK transmissions from the relay UE to the eNodeB.

Example 7 includes the apparatus of any of Examples 1-6, wherein the control signaling communicated from the eNodeB to the relay UE is UE-specific dedicated signaling or common radio resource control (RRC) signaling.

Example 8 includes an apparatus of an eNodeB operable to control communications at a relay user equipment (UE), the apparatus comprising one or more processors and memory configured to: select, at the eNodeB, the relay UE to relay proximity services (ProSe) traffic between the eNodeB and a remote UE based on one or more relay quality indicators associated with the relay UE; and communicate, from the eNodeB, control signaling to configure one or more orthogonal timelines at the relay UE to resolve predefined types of communications performed at the relay UE to defined subframes, wherein the control signaling causes the relay UE to resolve predefined types of concurrent communications with at least one of the eNodeB and the remote UE, wherein the relay UE is in-coverage of the eNodeB and the remote UE is in-coverage or out-of-coverage of the eNodeB.

Example 9 includes the apparatus of Example 8, wherein the one or more orthogonal timelines configured at the relay UE causes the relay UE to resolve ProSe communications at the relay UE that conflict with uplink hybrid automatic repeat request (HARQ) acknowledgement (ACK) or negative acknowledgement (NACK) transmissions from the relay UE to the eNodeB.

Example 10 includes the apparatus of any of Examples 8-9, wherein the one or more orthogonal timelines configured at the relay UE causes the relay UE to perform at least one of the following: resolve ProSe transmissions from the relay UE to the remote UE that conflict with uplink cellular transmissions from the relay UE to the eNodeB; resolve ProSe receptions at the relay UE from the remote UE that conflict with uplink cellular transmissions from the relay UE to the eNodeB; or resolve ProSe transmissions from the relay UE to the remote UE that conflict with ProSe receptions at the relay UE from the remote UE.

Example 11 includes the apparatus of any of Examples 8-10, further configured to: receive, from the relay UE, at least one of: uplink cellular traffic from the relay UE or ProSe traffic associated with the remote UE based on the one or more orthogonal timelines configured for the relay UE; and transmit, to the relay UE, downlink (DL) cellular traffic to the relay UE based on a DL orthogonal timeline configured for the relay UE.

Example 12 includes the apparatus of any of Examples 8-11, further configured to perform an alignment of resources for downlink (DL) receptions, uplink (UL) transmissions, and ProSe transmissions and receptions at the relay UE in order to resolve the predefined types of concurrent communications at the relay UE.

Example 13 includes the apparatus of any of Examples 8-12, wherein the control signaling communicated to the relay UE to configure the one or more orthogonal timelines indicates: a defined resource pool of subframes that are orthogonal in time, wherein the relay UE is configured to resolve the predefined types of concurrent communications with at least one of the eNodeB and the remote UE by utilizing defined subframes in the defined resource pool to perform predefined types of communications; or two resource pools of subframes that are orthogonal in time, wherein the relay UE is configured to resolve the predefined types of concurrent communications with at least one of the eNodeB and the remote UE by utilizing defined subframes in the two resource pool to perform predefined types of communications; or a subset of Time Resource Patterns (T-RPTs), wherein the relay UE is configured to resolve the predefined types of concurrent communications with at least one of the eNodeB and the remote UE when utilizing the subset of T-RPTs to perform predefined types of communications.

Example 14 includes the apparatus of any of Examples 8-13, further configured to communicate control signaling to configure one or more orthogonal timelines for a plurality of relay UEs, wherein the eNodeB is operable to configure aligned resources for the plurality of relay UEs by assigning a same resource pool of subframes, sidelink control information (SCI) resource index, Time Resource Patterns (T-RPT), physical resource blocks and transmission parameters to the plurality of relay UEs, wherein the transmission parameters include a modulation and coding scheme (MCS) index.

Example 15 includes the apparatus of any of Examples 8-14, wherein the relay quality indicators used to select the relay UE include at least one of: a reference signal received quality (RSRQ), a reference signal received power (RSRP), a received signal strength indicator (RSSI), channel state information (CSI), or interference levels associated with the relay UE.

Example 16 includes the apparatus of any of Examples 8-15, further configured to select the relay UE to relay ProSe traffic between the eNodeB and the remote UE when the one or more relay quality indicators exceed a defined threshold or based on a maximum value among the one or more relay quality indicators.

Example 17 includes the apparatus of any of Examples 8-16, wherein: the eNodeB controls ProSe communication resources in accordance with a first sidelink transmission mode; or at least one of the relay UE or the remote UE selects ProSe communication resources from a defined resource pool of subframes that is configured by the eNodeB in accordance with a second sidelink transmission mode.

Example 18 includes an apparatus of a relay user equipment (UE) operable to resolve predefined types of concurrent communications with at least one of an eNodeB and a remote UE, the apparatus comprising one or more processors and memory configured to: receive, from the eNodeB, control signaling that configures one or more orthogonal timelines at the relay UE, wherein the one or more orthogonal timelines causes the relay UE to resolve the predefined types of concurrent communications with at least one of the eNodeB and the remote UE; and perform, at the relay UE, at least one of cellular communications or proximity services (ProSe) communications with at least one of the eNodeB or the remote UE in accordance with the one or more orthogonal timelines configured by the eNodeB.

Example 19 includes the apparatus of Example 18, further configured to: measure one or more relay quality indicators associated with the relay UE, wherein the relay quality indicators include at least one of: a reference signal received quality (RSRQ), a reference signal received power (RSRP), a received signal strength indicator (RSSI), channel state information (CSI), or interference levels associated with the relay UE; and determine to act as a relay between the eNodeB and the remote UE when the one or more relay quality indicators exceed a defined threshold.

Example 20 includes the apparatus of any of Examples 18-19, wherein the one or more orthogonal timelines configured at the relay UE causes the relay UE to resolve ProSe communications at the relay UE that conflict with uplink hybrid automatic repeat request (HARQ) acknowledgement (ACK) or negative acknowledgement (NACK) transmissions from the relay UE to the eNodeB.

Example 21 includes the apparatus of any of Examples 18-20, wherein the one or more orthogonal timelines configured at the relay UE causes the relay UE to perform at least one of the following: resolve ProSe transmissions from the relay UE to the remote UE that conflict with uplink cellular transmissions from the relay UE to the eNodeB; resolve ProSe receptions at the relay UE from the remote UE that conflict with uplink cellular transmissions from the relay UE to the eNodeB; or resolve ProSe transmissions from the relay UE to the remote UE that conflict with ProSe receptions at the relay UE from the remote UE.

Example 22 includes the apparatus of any of Examples 18-21, further configured to receive, from the eNodeB, an alignment of resources for downlink (DL) receptions, uplink (UL) transmissions, and ProSe transmissions and receptions in order to resolve the predefined types of concurrent communications at the relay UE.

Example 23 includes the apparatus of any of Examples 18-22, wherein: the relay UE is in a radio resource control (RRC) connected state when relaying unicast or multicast traffic from the remote UE to the eNodeB; and the relay UE is in a radio resource control (RRC) connected state or an RRC idle state when relaying unicast or multicast traffic from the eNodeB to the remote UE.

Example 24 includes the apparatus of any of Examples 18-23, wherein the relay UE includes at least one of an antenna, a touch sensitive display screen, a speaker, a microphone, a graphics processor, an application processor, a baseband processor, an internal memory, a non-volatile memory port, and combinations thereof.

Example 25 includes at least one machine readable storage medium having instructions embodied thereon for communicating proximity services (ProSe) traffic from a remote user equipment (UE) to an eNodeB via a relay UE, the instructions when executed perform the following: selecting, using one or more processors of the remote UE, the relay UE to relay ProSe traffic between the remote UE and the eNodeB based on one or more relay quality indicators associated with the relay UE; receiving, using one or more processors of the remote UE, signaling from the relay UE to configure one or more orthogonal timelines at the remote UE, wherein the one or more orthogonal timelines causes the remote UE to resolve a predefined type of concurrent communication with the relay UE; and performing, using one or more processors of the remote UE, a ProSe communication with the remote UE in accordance with the one or more orthogonal timelines configured by the relay UE.

Example 26 includes the at least one machine readable storage medium of Example 25, further comprising instructions which when executed perform the following: performing a discovery procedure in order to discover the relay UE.

Example 27 includes the at least one machine readable storage medium of any of Examples 25-26, wherein the one or more orthogonal timelines configured at the remote UE to resolve the predefined type of concurrent communication causes the remote UE to resolve ProSe transmissions from the remote UE to the relay UE that conflict with ProSe receptions from the relay UE to the remote UE.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to control communications at a relay user equipment (UE), the apparatus comprising one or more processors and memory configured to:
   select, the relay UE to relay proximity services (ProSe) traffic between the eNodeB and a remote UE based on one or more relay quality indicators associated with the relay UE; and
   communicate, to the relay UE, control signaling to configure one or more orthogonal timelines to cause the relay UE to resolve ProSe communications between the relay UE and the remote UE that conflict with uplink hybrid automatic repeat request (HARQ) acknowledgement (ACK) or negative acknowledgement (NACK) transmissions from the relay UE to the eNodeB,
   wherein the control signaling communicated from the eNodeB to the relay UE configures a reduction in a number of uplink subframes used for HARQ ACK/NACK transmissions at the relay UE in order to resolve conflicts between ProSe communications at the relay UE with the remote UE and HARQ ACK/NACK transmissions from the relay UE to the eNodeB.

2. The apparatus of claim 1, wherein the HARQ ACK/NACK transmissions from the relay UE to the eNodeB are in response to downlink cellular transmissions from the eNodeB to the relay UE.

3. The apparatus of claim 1, wherein the control signaling communicated from the eNodeB to the relay UE configures an exclusion of HARQ ACK/NACK transmissions from the relay UE in order to resolve conflicts between ProSe communications at the relay UE with the remote UE and HARQ ACK/NACK transmissions from the relay UE to the eNodeB.

4. The apparatus of claim 1, wherein the control signaling communicated from the eNodeB to the relay UE configures a bundling or multiplexing of HARQ ACK/NACKs at the relay UE in order to resolve conflicts between ProSe communications at the relay UE with the remote UE and HARQ ACK/NACK transmissions from the relay UE to the eNodeB.

5. The apparatus of claim 1, wherein the control signaling communicated from the eNodeB to the relay UE configures an alignment between ProSe transmission and reception patterns utilized by the relay UE and HARQ ACK/NACK transmission patterns utilized by the relay UE in order to resolve conflicts between ProSe communications at the relay UE with the remote UE and HARQ ACK/NACK transmissions from the relay UE to the eNodeB.

6. The apparatus of claim 1, wherein the control signaling communicated from the eNodeB to the relay UE is UE-specific dedicated signaling or common radio resource control (RRC) signaling.

7. An apparatus of an eNodeB operable to control communications at a relay user equipment (UE), the apparatus comprising one or more processors and memory configured to:
   select, the relay UE to relay proximity services (ProSe) traffic between the eNodeB and a remote UE based on one or more relay quality indicators associated with the relay UE;
   communicate, control signaling to configure one or more orthogonal timelines at the relay UE to resolve predefined types of communications performed at the relay UE to defined subframes, wherein the control signaling causes the relay UE to resolve predefined types of concurrent communications with at least one of the eNodeB and the remote UE,
   wherein the relay UE is in-coverage of the eNodeB and the remote UE is in-coverage or out-of-coverage of the eNodeB; and
   perform an alignment of resources for downlink (DL) receptions, uplink (UL) transmissions, and ProSe transmissions and receptions at the relay UE in order to resolve the predefined types of concurrent communications at the relay UE.

8. The apparatus of claim 7, wherein the one or more orthogonal timelines configured at the relay UE causes the relay UE to resolve ProSe communications at the relay UE that conflict with uplink hybrid automatic repeat request (HARQ) acknowledgement (ACK) or negative acknowledgement (NACK) transmissions from the relay UE to the eNodeB.

9. The apparatus of claim 7, wherein the one or more orthogonal timelines configured at the relay UE causes the relay UE to perform at least one of the following:
   resolve ProSe transmissions from the relay UE to the remote UE that conflict with uplink cellular transmissions from the relay UE to the eNodeB;
   resolve ProSe receptions at the relay UE from the remote UE that conflict with uplink cellular transmissions from the relay UE to the eNodeB; or
   resolve ProSe transmissions from the relay UE to the remote UE that conflict with ProSe receptions at the relay UE from the remote UE.

10. The apparatus of claim 7, further configured to:
    receive, from the relay UE, at least one of: uplink cellular traffic from the relay UE or ProSe traffic associated with the remote UE based on the one or more orthogonal timelines configured for the relay UE; and
    transmit, to the relay UE, downlink (DL) cellular traffic to the relay UE based on a DL orthogonal timeline configured for the relay UE.

11. The apparatus of claim 7, wherein the control signaling communicated to the relay UE to configure the one or more orthogonal timelines indicates:
    a defined resource pool of subframes that are orthogonal in time, wherein the relay UE is configured to resolve the predefined types of concurrent communications with at least one of the eNodeB and the remote UE by utilizing defined subframes in the defined resource pool to perform predefined types of communications; or two resource pools of subframes that are orthogonal in time, wherein the relay UE is configured to resolve the predefined types of concurrent communications with at least one of the eNodeB and the remote UE by utilizing defined subframes in the two resource pool to perform predefined types of communications; or a subset of Time Resource Patterns (T-RPTs), wherein the relay UE is configured to resolve the predefined types of concurrent communications with at least one of the eNodeB and the remote UE when utilizing the subset of T-RPTs to perform predefined types of communications.

12. The apparatus of claim 7, further configured to communicate control signaling to configure one or more orthogonal timelines for a plurality of relay UEs, wherein the eNodeB is operable to configure aligned resources for the plurality of relay UEs by assigning a same resource pool of subframes, sidelink control information (SCI) resource index, Time Resource Patterns (T-RPT), physical resource blocks and transmission parameters to the plurality of relay UEs, wherein the transmission parameters include a modulation and coding scheme (MCS) index.

13. The apparatus of claim 7, wherein the relay quality indicators used to select the relay UE include at least one of: a reference signal received quality (RSRQ), a reference signal received power (RSRP), a received signal strength indicator (RSSI), channel state information (CSI), or interference levels associated with the relay UE.

14. The apparatus of claim 7, further configured to select the relay UE to relay ProSe traffic between the eNodeB and the remote UE when the one or more relay quality indicators exceed a defined threshold or based on a maximum value among the one or more relay quality indicators.

15. The apparatus of claim 7, wherein:
the eNodeB controls ProSe communication resources in accordance with a first sidelink transmission mode; or
at least one of the relay UE or the remote UE selects ProSe communication resources from a defined resource pool of subframes that is configured by the eNodeB in accordance with a second sidelink transmission mode.

16. An apparatus of a relay user equipment (UE) operable to resolve predefined types of concurrent communications with at least one of an eNodeB and a remote UE, the apparatus comprising one or more processors and memory configured to:
receive, from the eNodeB, control signaling that configures one or more orthogonal timelines at the relay UE, wherein the one or more orthogonal timelines causes the relay UE to resolve the predefined types of concurrent communications with at least one of the eNodeB and the remote UE;
receive, from the eNodeB, an alignment of resources for downlink (DL) receptions, uplink (UL) transmissions, and ProSe transmissions and receptions in order to resolve the predefined types of concurrent communications at the relay UE; and
perform, at least one of cellular communications or proximity services (ProSe) communications with at least one of the eNodeB or the remote UE in accordance with the one or more orthogonal timelines configured by the eNodeB.

17. The apparatus of claim 16, further configured to:
measure one or more relay quality indicators associated with the relay UE, wherein the relay quality indicators include at least one of: a reference signal received quality (RSRQ), a reference signal received power (RSRP), a received signal strength indicator (RSSI), channel state information (CSI), or interference levels associated with the relay UE; and
determine to act as a relay between the eNodeB and the remote UE when the one or more relay quality indicators exceed a defined threshold.

18. The apparatus of claim 16, wherein the one or more orthogonal timelines configured at the relay UE causes the relay UE to resolve ProSe communications at the relay UE that conflict with uplink hybrid automatic repeat request (HARQ) acknowledgement (ACK) or negative acknowledgement (NACK) transmissions from the relay UE to the eNodeB.

19. The apparatus of claim 16, wherein the one or more orthogonal timelines configured at the relay UE causes the relay UE to perform at least one of the following:
resolve ProSe transmissions from the relay UE to the remote UE that conflict with uplink cellular transmissions from the relay UE to the eNodeB;
resolve ProSe receptions at the relay UE from the remote UE that conflict with uplink cellular transmissions from the relay UE to the eNodeB; or
resolve ProSe transmissions from the relay UE to the remote UE that conflict with ProSe receptions at the relay UE from the remote UE.

20. The apparatus of claim 16, wherein:
the relay UE is in a radio resource control (RRC) connected state when relaying unicast or multicast traffic from the remote UE to the eNodeB; and
the relay UE is in a radio resource control (RRC) connected state or an RRC idle state when relaying unicast or multicast traffic from the eNodeB to the remote UE.

21. The apparatus of claim 16, wherein the relay UE includes at least one of an antenna, a touch sensitive display screen, a speaker, a microphone, a graphics processor, an application processor, a baseband processor, an internal memory, a non-volatile memory port, and combinations thereof.

22. At least one non-transitory machine readable storage medium having instructions embodied thereon for communicating proximity services (ProSe) traffic from a remote user equipment (UE) to an eNodeB via a relay UE, the instructions when executed cause the remote UE to perform the following:
selecting, using one or more processors of the remote UE, the relay UE to relay ProSe traffic between the remote UE and the eNodeB based on one or more relay quality indicators associated with the relay UE;
receiving, using the one or more processors of the remote UE, signaling from the relay UE to configure one or more orthogonal timelines at the remote UE, wherein the one or more orthogonal timelines causes the remote UE to resolve a predefined type of concurrent communication with the relay UE; and
performing, using the one or more processors of the remote UE, a ProSe communication in accordance with the one or more orthogonal timelines configured by the relay UE,
wherein the one or more orthogonal timelines configured at the remote UE to resolve the predefined type of concurrent communication causes the remote UE to resolve ProSe transmissions from the remote UE to the relay UE that conflict with ProSe receptions from the relay UE to the remote UE.

23. The at least one non-transitory machine readable storage medium of claim 22, further comprising instructions which when executed perform the following: performing a discovery procedure in order to discover the relay UE.

* * * * *